(12) United States Patent
Matsumoto et al.

(10) Patent No.: US 7,111,022 B1
(45) Date of Patent: Sep. 19, 2006

(54) RECORDING APPARATUS AND METHOD AND STORAGE MEDIUM

(75) Inventors: Kentaro Matsumoto, Higashikurume (JP); Kunihiro Yamamoto, Yokohama (JP); Kiyoshi Kusama, Kawasaki (JP); Takashi Hanamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 09/651,293

(22) Filed: Aug. 30, 2000

(30) Foreign Application Priority Data

| Aug. 31, 1999 | (JP) | ............................................ 11-245186 |
| Jul. 26, 2000 | (JP) | ....................................... 2000-225894 |
| Jul. 26, 2000 | (JP) | ....................................... 2000-225895 |

(51) Int. Cl.
*G06F 17/30* (2006.01)

(52) U.S. Cl. ............................ 707/203; 707/3; 707/102

(58) Field of Classification Search ............... 707/1–10, 707/100–104.1, 200–205; 709/201; 235/454; 717/114; 345/840
See application file for complete search history.

(56) References Cited

U.S. PATENT DOCUMENTS

| 5,459,307 | A | * | 10/1995 | Klotz, Jr. .................... 235/454 |
| 5,745,907 | A | | 4/1998 | Yamamoto .................. 707/502 |
| 6,028,605 | A | * | 2/2000 | Conrad et al. ............... 345/840 |
| 6,209,124 | B1 | * | 3/2001 | Vermeire et al. ........... 717/114 |
| 6,381,628 | B1 | * | 4/2002 | Hunt .......................... 709/201 |

FOREIGN PATENT DOCUMENTS

| EP | 1045315 A2 | 10/2000 |
| EP | 1045317 A2 | 10/2000 |

OTHER PUBLICATIONS

Kuchinsky, A. et al., A. et al., "FotoFile: a Consumer Multimedia Organization and Retrieval System", CHI '99 Conf. Proceedings Human Factors In Computing Systems, Pittsburgh, PA., May 15–20, 1999. pp. 496–503, XP000894256, ISBN: 0-201-48559-1.
Knoll, A., "Dissemination and Archival Storage of Old Materials as Electronic Documents", Feb. 2, 1999, XP002278066, http://digit.nkp.cz/English Articles/Read ad_Papers/Warszawa.html.
Day, M., "CEDARS: Digital Preservation And Metadata", Jun. 17, 1998, pp. 53–58, XP002278065.

* cited by examiner

*Primary Examiner*—Mohammad Ali
(74) *Attorney, Agent, or Firm*—Fitzpatrick, Cella, Harper & Scinto

(57) ABSTRACT

Various recording apparatuses and methods, each capable of repeatedly attaching the same meta-data as information related to binary data to a plurality of binary data to generate a plurality of binary data having meta-data.

A first recording apparatus generates binary data by image sensing and also generate meta-data as information related to the binary data. This apparatus can repeatedly attach the same meta-data generated to the generated binary data to easily generate a plurality of binary data having meta-data.

A second recording apparatus loads and uses binary data instead of generating it and can generate meta-data and repeatedly attach the same meta-data to a plurality of loaded binary data to easily generate binary data having meta-data.

A third recording apparatus can generate the meta-data using a dedicated meta-data generation apparatus, store the meta-data in a storage medium, and load and use the meta-data from the storage medium, and also generate binary data and repeatedly attach the same meta-data loaded to generated binary data to easily generate a plurality of binary data having meta-data.

68 Claims, 32 Drawing Sheets

FIG. 8

―META-DATA FILE ( CardInfo. xml )

<? xml version = "1.0" encoding = "Shift_JIS" ? >

< Photo >

< ITEM ATTR = "Photographer" > Taro   </ITEM >
   < ITEM ATTR = "Data" > 1999-06-14   </ITEM >
   < ITEM ATTR = "Event" > ATHLETIC MEETING   </ITEM >
   < ITEM ATTR = "Location" > ATHLETIC PARK   </ITEM >

</Photo >

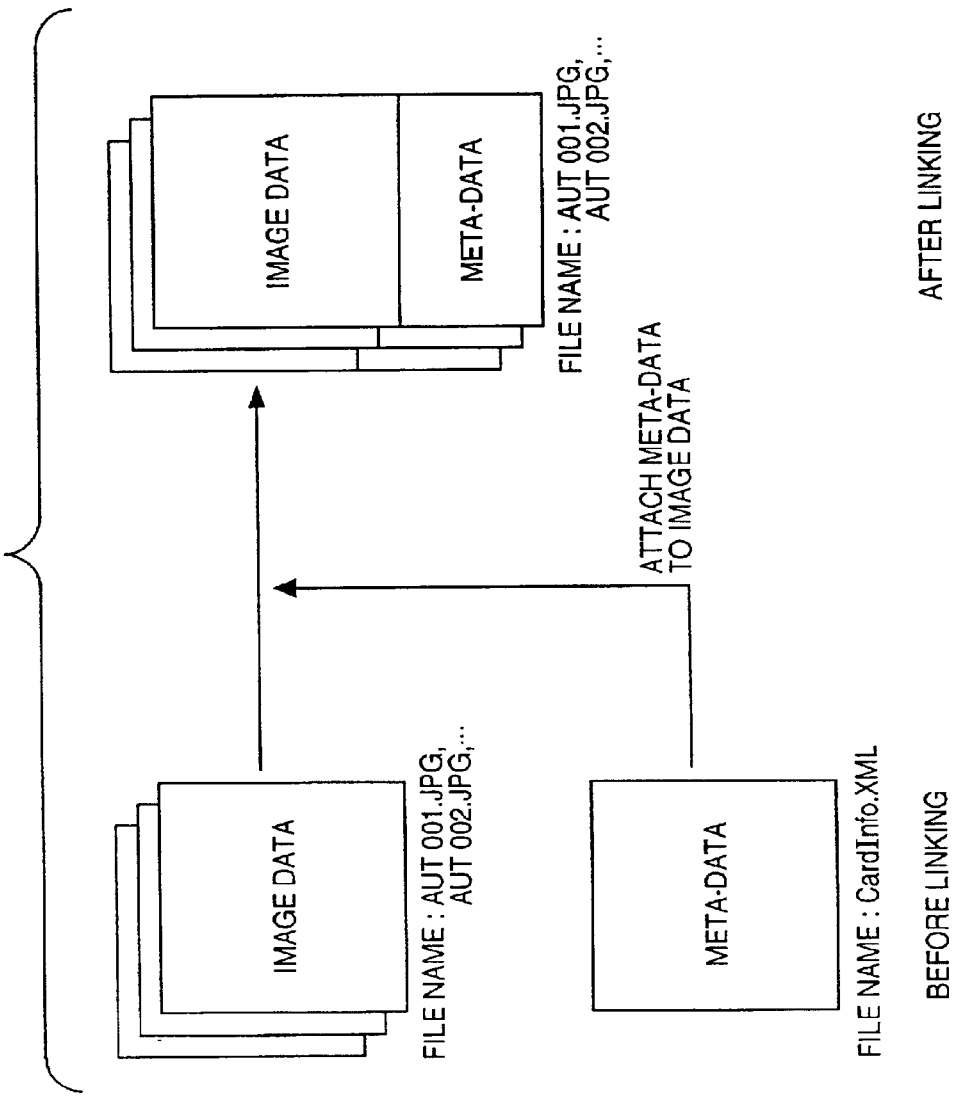

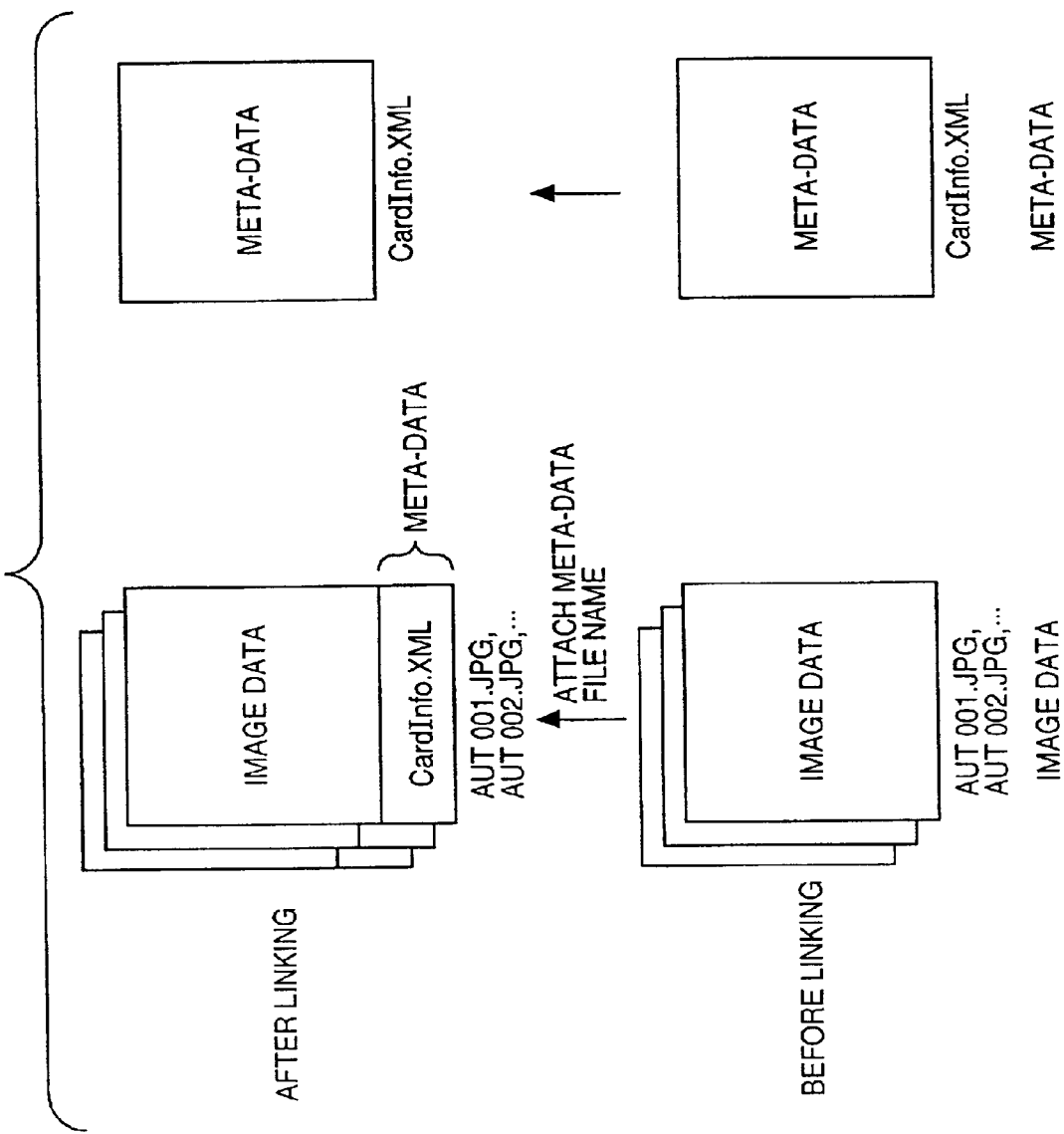

```
< ! xml ... >
< Photo >
    < ITEM ... = "Event" > Travel < /ITEM >
        .
        .
        .
    < /Photo >
```

MEMORY CARD FOR TRAVEL

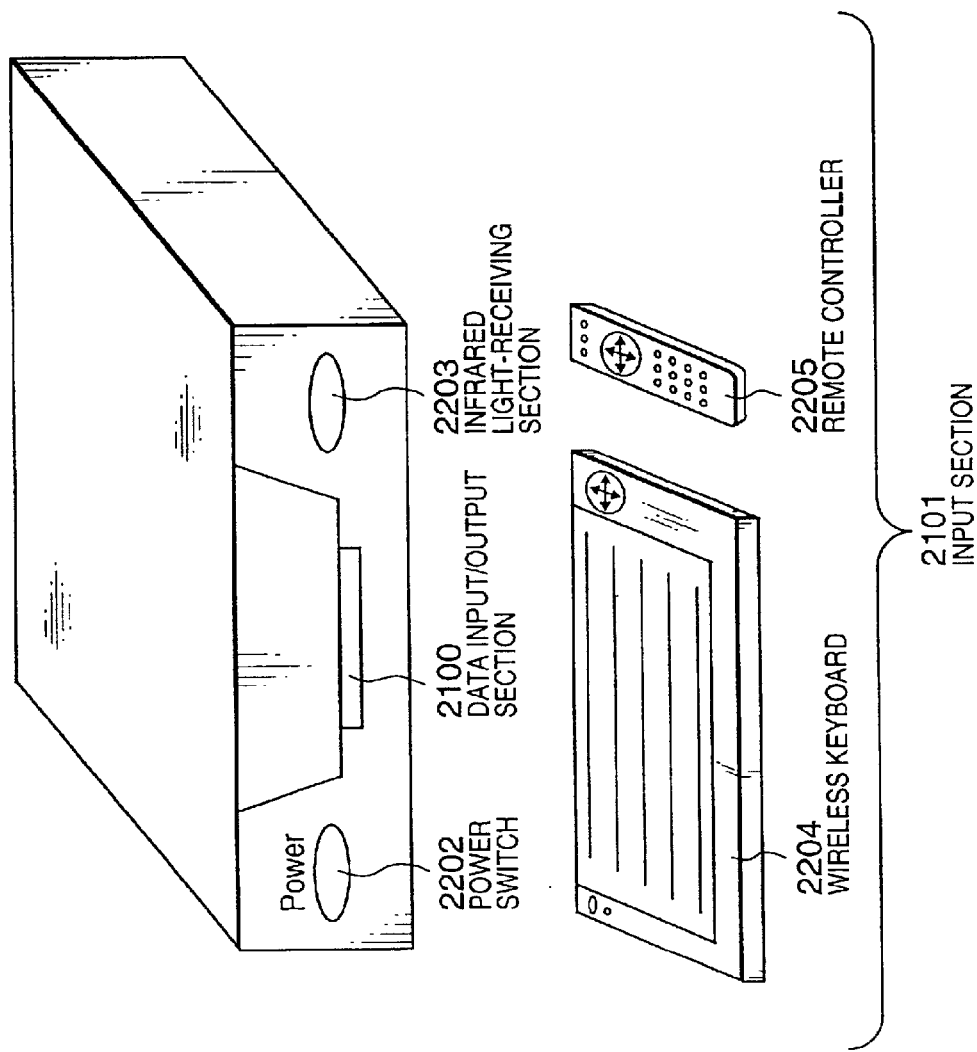

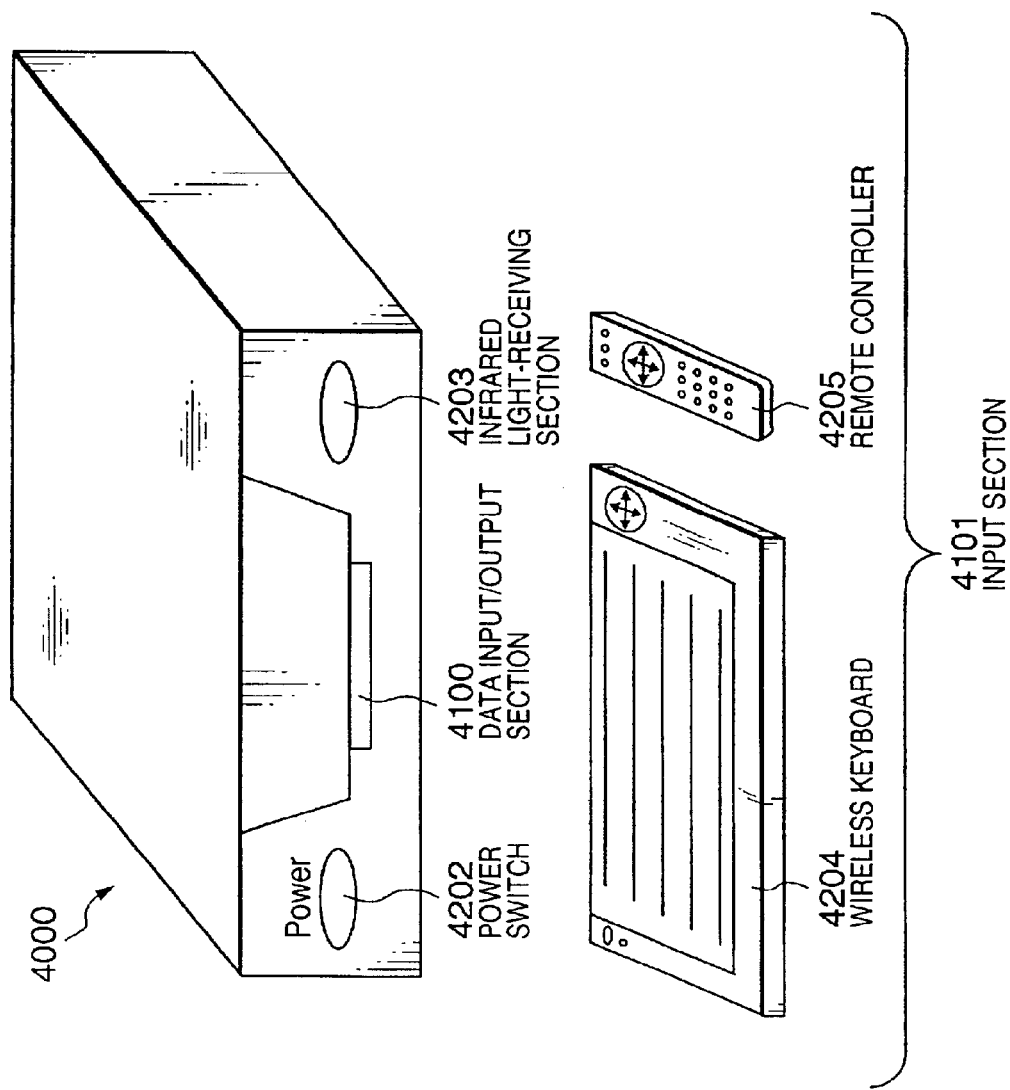

4307
INPUT TERMINAL
( DATA
INPUT/OUTPUT
SECTION 4100 )

4306
DISPLAY OUTPUT
TERMINAL
( DISPLAY
SECTION 4103 )

3205
LIQUID CRYSTAL PANEL
( DISPLAY SECTION 3103 )

3206
OPERATION BUTTONS
( INPUT SECTION 3101 )

RECORDING APPARATUS AND METHOD AND STORAGE MEDIUM

FIELD OF THE INVENTION

The present invention relates to a recording apparatus and method and storage medium and, more particularly, to a recording apparatus and method for attaching meta-data as information related to binary data to, e.g., binary data such as still image data, moving image data, or voice data obtained using a digital still camera or digital video camera.

BACKGROUND OF THE INVENTION

Along with the spread of digital still cameras or digital video cameras, the quantity of binary data such as still image data, moving image data, and voice data to be processed in general homes is greatly increasing. To use the binary data, a certain search method or management method is required. For this purpose, a method has been used in which meta-data as information related to the contents, characteristics, and meanings of binary data, e.g., a person's name, event title, date, and keyword described in the binary data are attached to the binary data, and the binary data is searched for or managed using this attached meta-data.

When meta-data representing personal information is attached to each binary data, the person who owns the binary data can be discriminated. Hence, even when a plurality of persons share and use one server, the meta-data can be used for personal management of binary data or privacy protection.

In many cases, however, no meta-data is attached to binary data sensed with a digital still camera or digital video camera, and the meta-data method is not effectively used. One reason for this is that even when an application for processing meta-data is used, generation of meta-data and attachment of it to binary data are time-consuming. For example, to attach appropriate meta-data to binary data, the meta-data must be generated and attached while confirming the contents of the binary data. Even when the same meta-data can be repeatedly used for binary data generated under almost the same conditions, the meta-data must be repeatedly generated and attached in units of binary data. In addition, often no meta-data is attached to binary data because in loading binary data in a server, generation and attachment of meta-data to the binary data are time-consuming.

The present invention has been made to solve the above problem, and has as its first object to provide a first recording apparatus and method capable of easily generating meta-data as information related to binary data such as still image data, moving image data, or voice data, generating binary data such as image data and voice data, and repeatedly attaching the same meta-data generated to a plurality of generated binary data to easily generate binary data having meta-data.

It is the second object of the present invention to provide a second recording apparatus and method capable of easily generating meta-data, using binary data loaded from a storage medium or the like, and repeatedly attaching the same meta-data generated to a plurality of loaded binary data to easily generate binary data having meta-data.

It is the third object of the present invention to provide a third recording apparatus and method capable of using meta-data loaded from a storage medium or the like, generating binary data, and repeatedly attaching the same meta-data loaded to a plurality of generated binary data to easily generate binary data having meta-data. The present invention also provides a meta-data generation apparatus and method for easily generating meta-data and storing it in a storage medium.

SUMMARY OF THE INVENTION

In order to achieve the above object, the first recording apparatus of the present invention has the following feature. There is provided a recording apparatus for attaching, to binary data, meta-data as information related to the binary data, comprising meta-data generation means for generating the meta-data, binary data generation means for generating the binary data to which the meta-data is to be attached, and meta-data attaching means for attaching the same meta-data to a plurality of binary data generated by the binary data generation means to generate binary data having meta-data.

In order to achieve the above object, the second recording apparatus of the present invention has the following feature. There is provided a recording apparatus for attaching, to binary data, meta-data as information related to the binary data, comprising meta-data generation means for generating the meta-data, binary data loading means for loading the binary data to which the meta-data is to be attached from a first detachable storage medium or external device, and meta-data attaching means for attaching the same meta-data to a plurality of binary data loaded by the binary data loading means to generate binary data having meta-data.

In order to achieve the above object, the third recording apparatus of the present invention has the following feature. There is provided a recording apparatus for attaching, to binary data, meta-data as information related to the binary data, comprising meta-data loading means for loading the meta-data from a first detachable storage medium or external device, binary data loading means for loading the binary data from the first detachable storage medium or external device, and meta-data attaching means for attaching the same meta-data loaded by the meta-data loading means to a plurality of binary data generated by the binary data generation means to generate binary data having meta-data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing a meta-data file;

FIG. 11 is a view for explaining the process of generating the first image data having meta-data;

FIG. 12 is a view for explaining the process of generating the second image data having meta-data;

FIG. 15A is a view showing the outer appearance of the recording apparatus according to the second embodiment;

FIG. 27A is a view showing the outer appearance of the meta-data generation apparatus according to the third embodiment;

DETAILED DESCRIPTION OF THE PREFERRED EMBODIMENTS

Preferred embodiments of the present invention will now be described in detail in accordance with the accompanying drawings.

An embodiment of the present invention will be described below in detail with reference to the accompanying drawings.

The embodiments will be described below mainly using still image data as an example of binary data such as still image data, moving image data, or voice image data. However, the present invention is not limited to the illustrated embodiments.

[First Embodiment]

As a recording apparatus of the first embodiment, a recording apparatus 200 capable of generating binary data by image sensing or the like, generating meta-data as information related to the binary data, and repeatedly attaching the same meta-data generated to generated binary data to easily generate and output a plurality of binary data each having meta-data will be described. In the following description, still image data is used as binary data.

[Hardware Configuration of Recording Apparatus]

Figure 1:
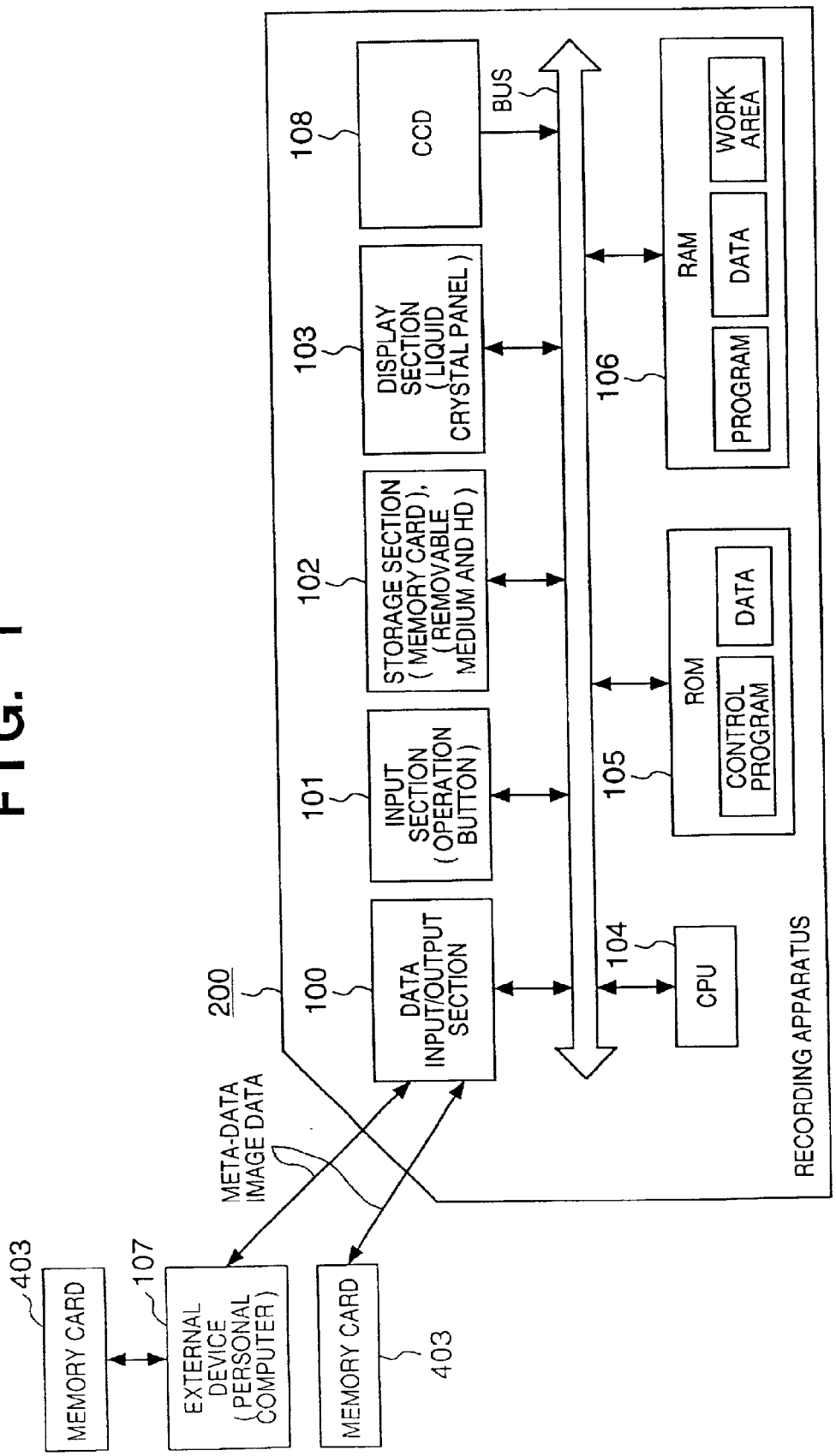
FIG. 1 is a block diagram showing a system configuration of a recording apparatus according to the first embodiment.

FIG. 1 is a block diagram showing the system configuration of the recording apparatus 200.

Figure 3:
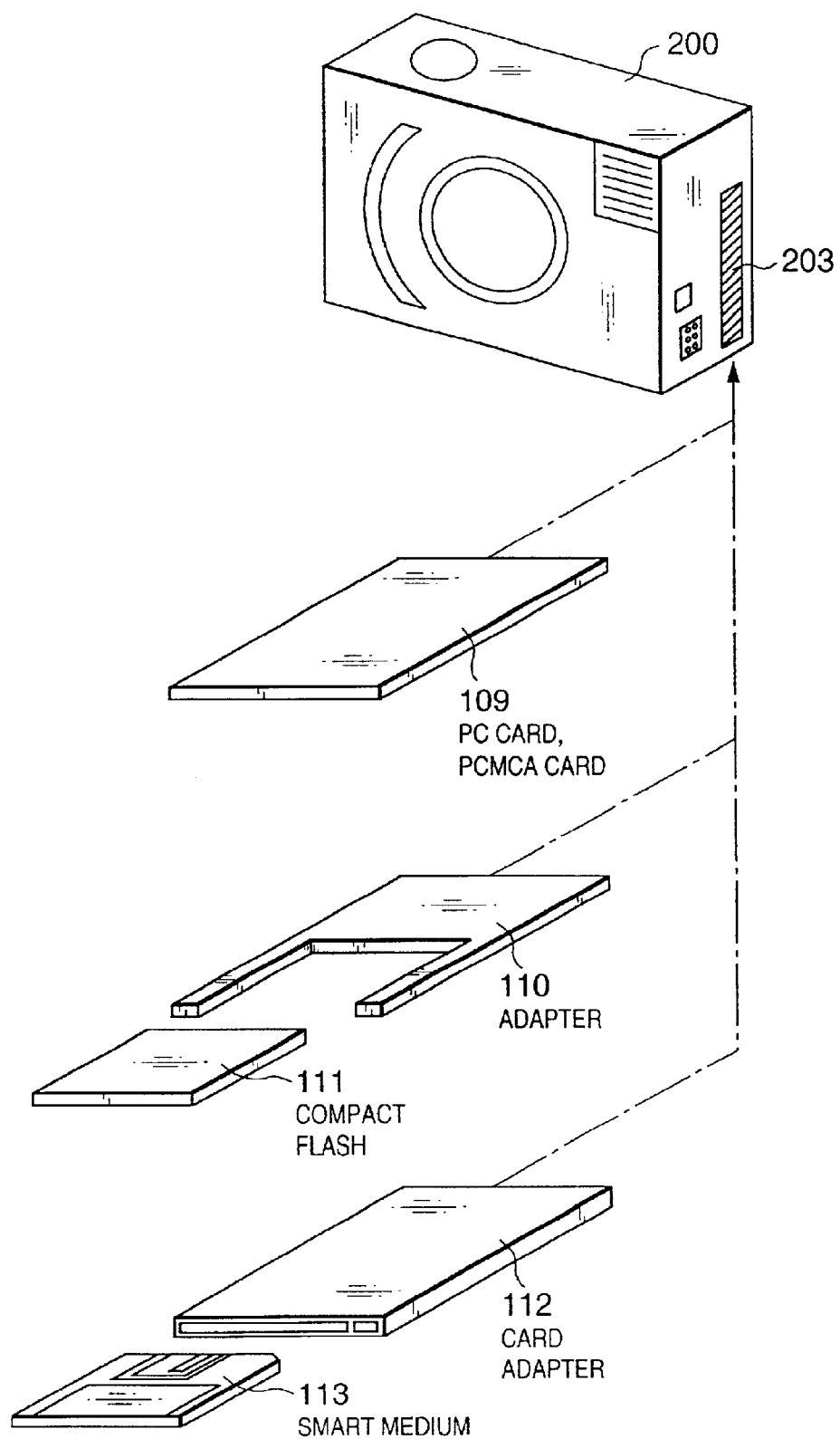
FIG. 3 is a view showing attachment of a memory card in the first embodiment.

A data input/output section 100 inputs/outputs binary data or meta-data. As shown in FIG. 3, a memory card such as a PC card or PCMCIA card 109 is directly inserted. The memory card such as a compact flash 111 or smart medium 113 is inserted via an adapter 110 or card adapter 112. Instead of a memory card, other removable storage medium (not shown) may be used.

The data input/output section 100 is connected to an external device 107 such as a personal computer via an input terminal such as a USB terminal, SCSI terminal, or parallel terminal. In the following description, a USB terminal is used as an input terminal.

Data (meta-data or binary data) recorded by the external device 107 is directly loaded from the external device 107 to the recording apparatus 200 through the input terminal, or temporarily stored on a memory card 403 and then loaded to the recording apparatus 200 through the memory card 403.

Conversely, data processed by the recording apparatus 200 is directly written in the external device 107 through the input terminal, or temporarily stored on the memory card 403 and then written in the external device 107 through the memory card 403. The data processed by the recording apparatus 200 can be written in a storage section 102 different from the memory card 403. The external device 107 and data input/output section 100 can be connected not directly as described above but by use of a wireless channel. In this case, a wireless channel interface corresponding to the external device 107 is exists in the data input/output section 100.

Figure 2A:
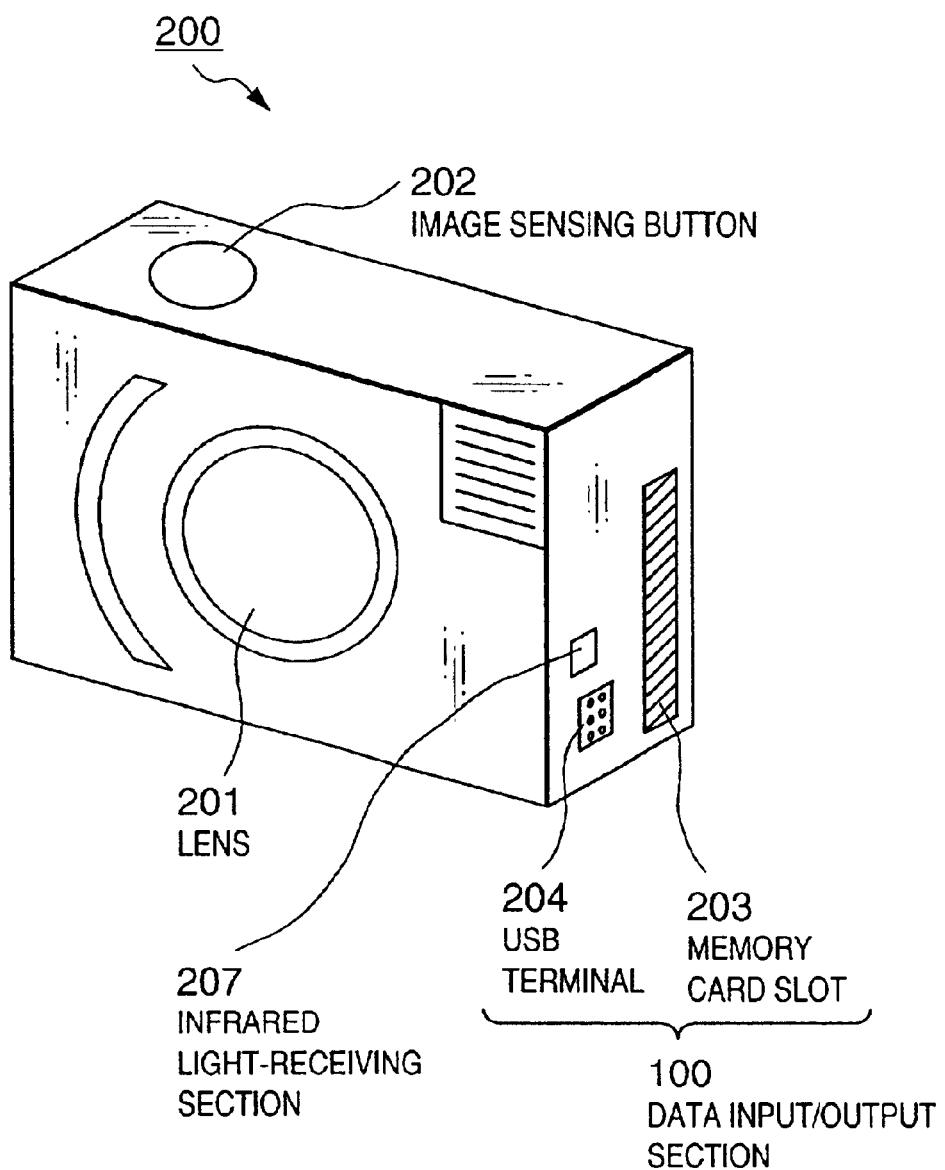
FIG. 2A is a view showing the outer appearance of the recording apparatus according to the first embodiment.
Figure 2B:
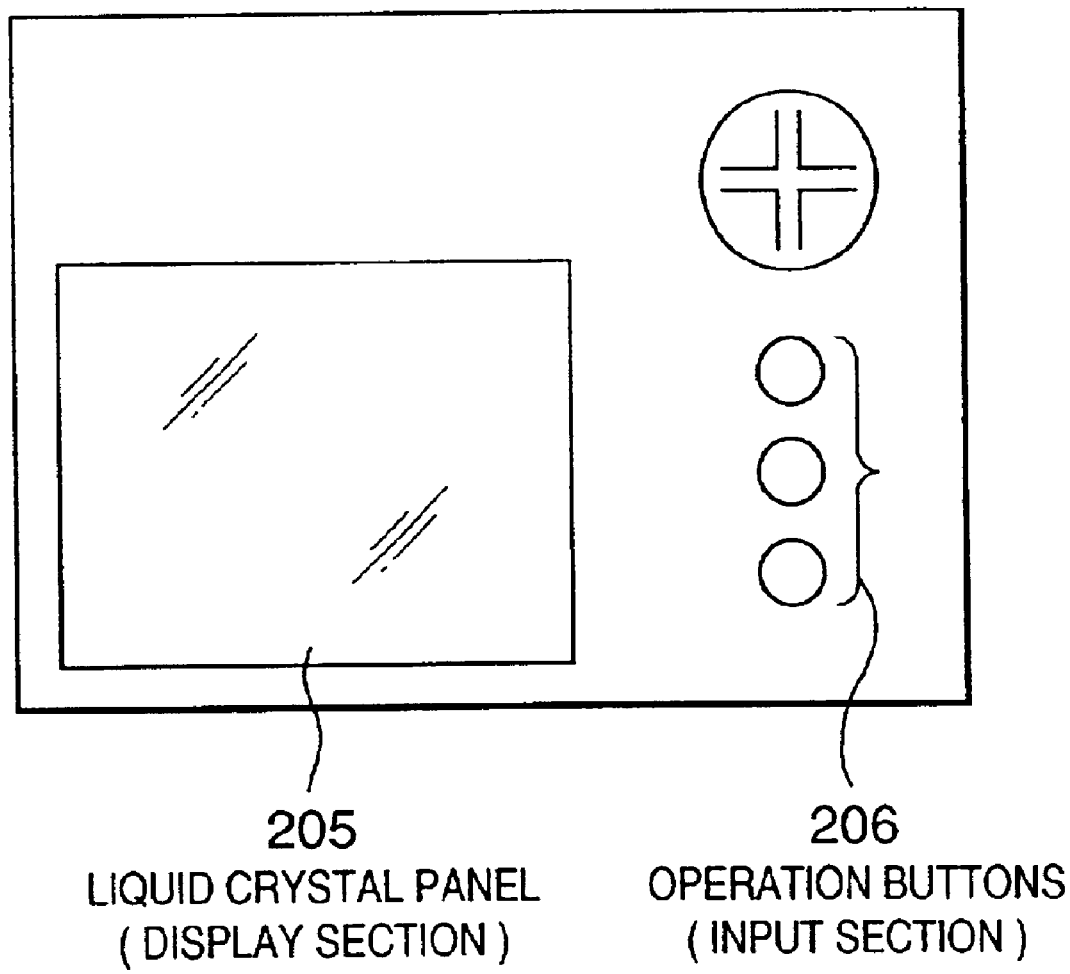
FIG. 2B is the rear view of the rear surface of the recording apparatus according to the first embodiment.

An input section 101 inputs data or an instruction from the user and is comprised of, e.g., operation buttons 206 shown in FIG. 2B. The storage section 102 stores binary data or meta-data and is formed from, e.g., a hard disk, removable medium, or memory card.

A display section 103 displays a GUI or image data and is constructed by, e.g., a liquid crystal panel.

A CPU 104 controls the entire recording apparatus 200. A ROM 105 and RAM 106 provide to the CPU 104 a program, data, and work area necessary for processing by the CPU 104.

Control programs necessary for processing operations shown in the flow charts of FIGS. 5, 6, 7, and 9 are stored in the storage section 102 or ROM 105. When the storage section 102 stores a control program, it is temporarily loaded to the RAM 106 and then executed.

A CCD 108 converts an optical image obtained by image sensing into an electrical signal, thereby generating image data. To convert voice into an electrical signal to generate voice data, a microphone (not shown) can be used in place of the CCD 108.

When a CCD (not shown) for generating moving image data is used in place of the CCD 108 for generating still image data, a tape or removable medium (not shown) for recording the moving image data can be used. Although the system configuration includes various components in addition to the above components, a detailed description thereof will be omitted because they are not main components of the present invention.

FIGS. 2A and 2B are views showing the outer appearance of the recording apparatus 200. The front surface shown in FIG. 2A has an image sensing lens 201, and the top surface has an image sensing button 202 as a member of the input section 101. The side surface shown in FIG. 2A has a memory card slot 203 as a member of the data input/output section 100, so data in a storage medium, i.e., memory card 403 inserted into the slot can be loaded into the recording apparatus 200 through the memory card 403. The side surface also has an input terminal (USB terminal 204) as another member of the data input/output section 100, which can be connected to an external device 107 and also to the memory card 403 inserted into the external device 107, thereby enabling exchange of meta-data or image data.

The rear surface shown in FIG. 2B has a liquid crystal panel 205, so sensed image data can be displayed, or a GUI for meta-data attachment can be displayed.

Figure 4:
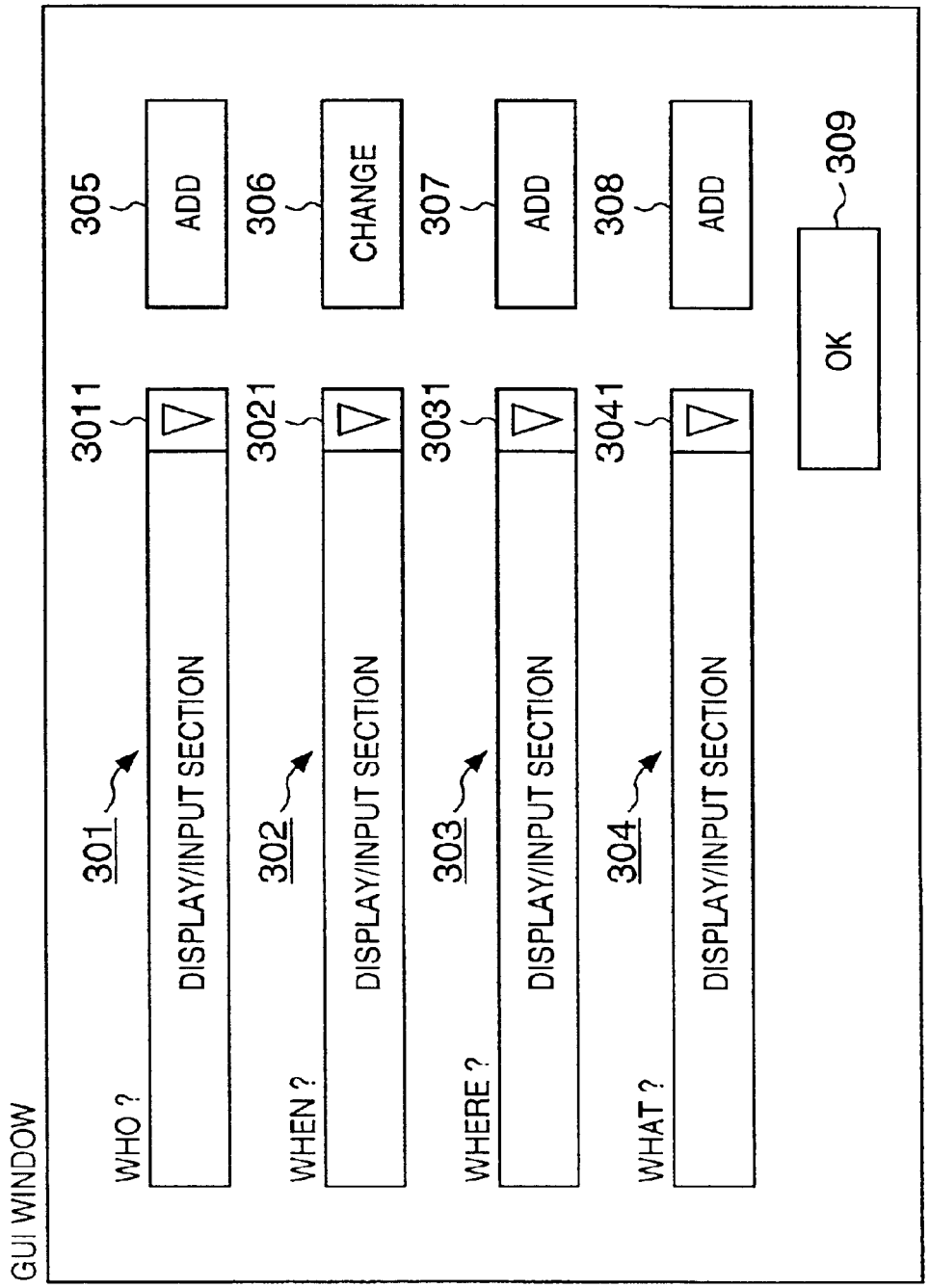
FIG. 4 is a view showing a meta-data registration GUI window.

The rear surface has operation buttons 206 as members of the input section 101, which are used for adjustment in image sensing, or to input meta-data or attach meta-data to image data. The operation buttons 206 are used to select, change, or add input data, or input new data, as shown in FIG. 4.

In the example shown in FIG. 2A, only the USB terminal 204 is shown as an input terminal. Other input terminal such as a parallel terminal or SCSI terminal can be used as far as it can transmit/receive data.

The external device 107 and data input/output section 100 may be connected not directly as described above but using a wireless channel. In this case, a wireless channel interface corresponding to the external device 107 is included in the data input/output section 100.

[Input of Meta-Data]

A series of operations of generating information of still image data as meta-data and storing it on the memory card 403 or the like using the recording apparatus 200 will be described, next, in detail. First, an input method for registering meta-data will be described with reference to FIG. 4.

FIG. 4 is a view showing a GUI window used to register meta-data.

The GUI window has display/input sections 301 to 304 for displaying meta-data registered in advance or displaying newly generated meta-data, buttons 3011, 3021, 3031, and 3041 used to display lists of registered meta-data, "add" buttons 305, 307, and 308 for adding information input using the operation buttons 206 when no appropriate information is present in the displayed list and the user wants to add new information, a "change" button 306 for changing the date and time of image sensing of still image data input using the operation buttons 206 and an "OK" button 309 for determining meta-data to be registered after the end of selection, addition, and change of meta-data to be registered.

A method of registering detailed items "Who?", "When?", "Where?", and "What?" as meta-data information of still image data using the GUI window shown in FIG. 4 will be described next.

Assume that "Who?" is "Taro", "When?" is "1999-6-14", "Where?" is "athletic park", and "What?" is "athletic meeting", and these meta-data are selected from lists of meta-data registered in advance or newly input and registered as meta-data.

"Who?" will be described first. When the button 3011 having an inverted triangular shape at the right end of the display/input section 301 is pressed, the first contents of the list registered for the button 3011 are displayed on the display/input section 301. When the button 3011 having an inverted triangular shape is pressed twice, the second contents of the list registered in advance for the button 3011 are displayed on the display/input section 301. Thus, the button 3011 is repeatedly pressed to search for "Taro" registered in the list in advance. If "Taro" is not present in the registered list, "Taro" is input using the operation buttons 206, and the "add" button 305 is pressed to add "Taro" to the item "Who?".

"When?" will be described next. Upon activating the GUI window, the current date and time are displayed on the display/input section 302. If the date is different from the date of image sensing, the date of image sensing or "1999-06-14" is input using the operation buttons 206, and then the "change" button 306 is pressed to add "1999-06-14" to the item "When?".

"Where?" will be described next. When the button 3031 having an inverted triangular shape at the right end of the display/input section 303 is pressed, the first contents of the list registered for the button 3031 in advance are displayed on the display/input section 303. When the button 3031 having an inverted triangular shape is pressed twice, the second contents of the list registered in advance for the button 3031 are displayed on the display/input section 303. Thus, the button 3031 is repeatedly pressed to search for "athletic park" registered in the list in advance. If "athletic park" is not present in the registered list, "athletic park" is input using the operation buttons 206, and the "add" button 307 is pressed to add "athletic park" to the item "Where?".

"What?" will be described next. When the button 3041 having an inverted triangular shape at the right end of the display/input section 304 is pressed, the first contents of the list registered for the button 3041 in advance are displayed on the display/input section 304. When the button 3041 having an inverted triangular shape is pressed twice, the second contents of the list registered in advance for the button 3041 are displayed on the display/input section 304. Thus, the button 3041 is repeatedly pressed to search for "athletic meeting" registered in the list in advance. If "athletic meeting" is not present in the registered list, "athletic meeting" is input using the operation buttons 206, and the "add" button 308 is pressed to add "athletic meeting" to the item "What?".

After all the items "Who?", "When?", "Where?", and "What?" are input, the "OK" button 309 is pressed to register the set items, thereby ending meta-data registration.

As meta-data registration, only the method of displaying, selecting, and inputting the items "Who?", "When?", "Where?", and "What?" has been described above. A method of displaying, selecting, and inputting another item on the window can be added.

[Generation and Storage of Meta-Data]

A series of operations for generating meta-data and storing it on the memory card 403 or in the storage section 102 using the recording apparatus 200 will be described next in detail with reference to FIGS. 5 to 8.

Figure 5:
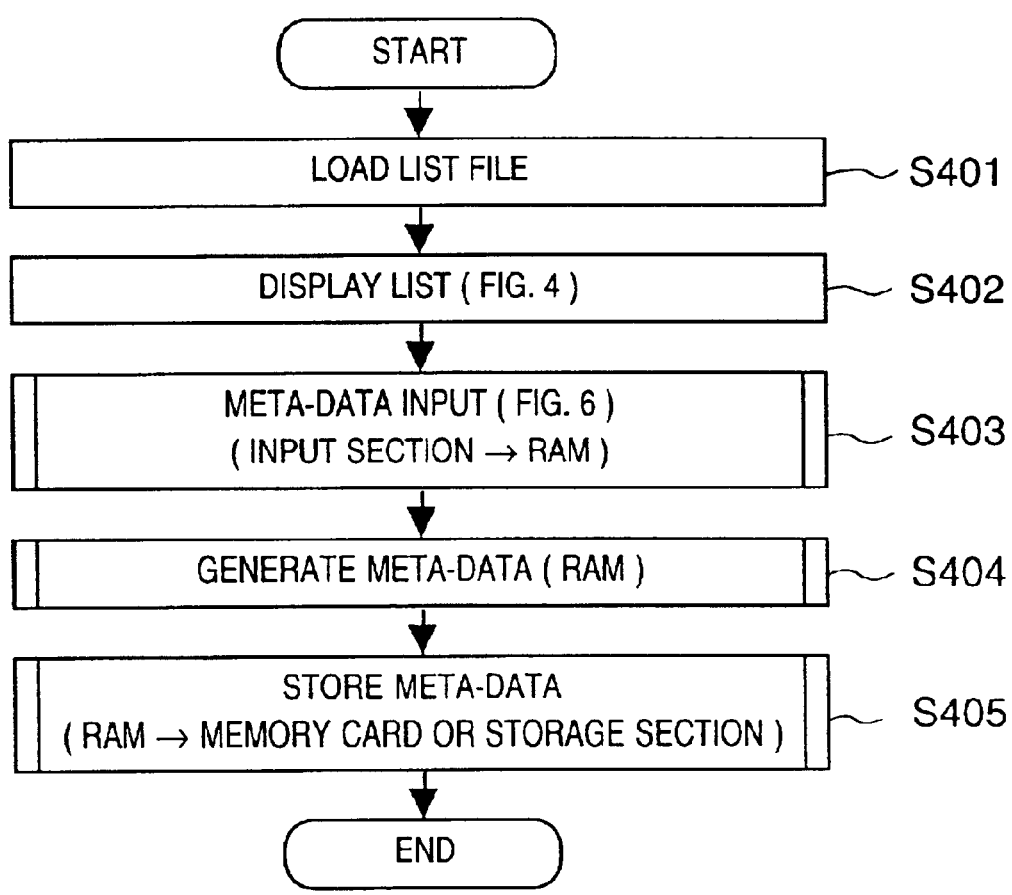
FIG. 5 is a flow chart of meta-data pre-registration.

FIG. 5 is a flow chart showing processing of generating meta-data and storing the generated meta-data on the memory card 403 or in the storage section 102 by the recording apparatus 200.

First, in step S401, list files "Who?", "When?", "Where?", and "What?" which are to be registered for the buttons 3011, 3021, 3031, and 3041 and displayed on the display/input sections 301 to 304 are loaded to the RAM 106.

In step S402, the loaded lists are displayed on the GUI window shown in FIG. 4.

In step S403, the user inputs meta-data "Who?", "When?", "Where?", and "What?" to the display/input sections 301 to 304, respectively. The input method has already been described above in detail with reference to FIG. 4, thus, the detailed description thereof will be omitted.

In step S404, when the "OK" button 309 shown in FIG. 4 is pressed, a meta-data file is generated on the basis of the input meta-data using a data description language, i.e., a markup language such as the XML shown in FIG. 8.

In the example shown in FIG. 8, the input meta-data are registered as a meta-data file with a file name: "CardInfo.xml". To describe the meta-data, a markup language XML is used. Instead of the XML, the SGML or HTML can be used.

In step S405, the generated meta-data file is written on the memory card 403 or in the storage section 102 through the data input/output section 100 and stored with the file name: "CardInfo.xml". Write processing on the memory card 403 or in the storage section 102 will be described later in detail with reference to FIG. 7, thus the detailed description thereof will be omitted at this time.

In the above-described example, one meta-data file is generated. However, a plurality of meta-data files may be generated. In this case, a meta-data file can be repeatedly generated to generate a plurality of meta-data files.

[Generation of Meta-Data File]

Figure 6:
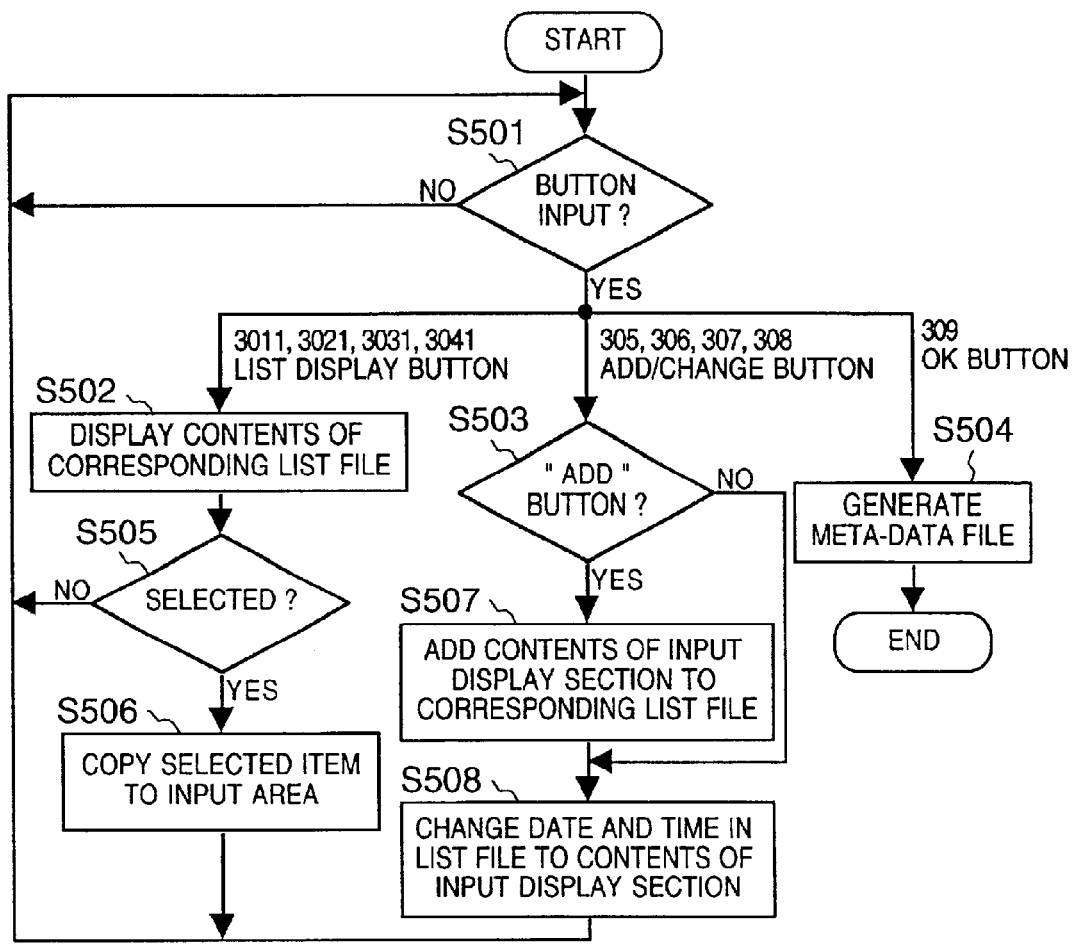
FIG. 6 is a flow chart of meta-data file generation.

FIG. 6 is a flow chart showing meta-data file generation executed by the recording apparatus 200 in step S404 on the basis of the input value of meta-data input by the user in step S403.

First, in step S501, it is checked whether the button 3011, 3021, 3031, or 3041 is pressed. If NO in step S501, processing waits until input is detected. If YES in step S501, the flow advances to step S502. When any one of the buttons 305 to 308 is pressed, the flow advances to step S503. When the button 309 is pressed, the flow advances to step S504.

When step S502 is selected, the contents of a list corresponding to one of the list display buttons 3011, 3021, 3031, and 3041 are displayed, and the flow advances to step S505. When the list file displayed in correspondence with one of the list display buttons 3011, 3021, 3031, and 3041 is selected, the flow advances to step S506. After the selected item is copied to the input area, the flow returns to step S501. When the displayed list file is not selected in step S505, the flow returns to step S501 without any processing.

When step S503 is selected, it is checked whether the "add" button 305, 307, or 308 is pressed or whether the "change" button 306 is pressed. When the "add" button 305, 307, or 308 is pressed, the flow advances to step S507. After the contents of the display/input section, which are added by the user, are added to a corresponding list file, the flow advances to step S508. When the "change" button 306 is pressed, the flow advances to step S508 without meaning processing step 7. In step S508, the date and time in the list file are changed to the contents on the display/input section, and the flow returns to step S501.

When step S504 is selected, and the "OK" button is pressed, a meta-data file is generated, and the series of operations are ended.

Thus, the meta-data file shown in FIG. 8 is generated.

In the above-described example, the user inputs meta-data using the operation buttons 206. As another input method, meta-data can be inputed from a remote controller using a G code or inputed by using voice recognition. Alternatively, the recording apparatus 200 can be connected to the external device 107 through the input terminal of the data input/output section 100, and meta-data can be input using the input section such as a keyboard of the external device 107.

FIG. 8 will be described. To describe meta-data, XML is used. XML (eXtensible Markup Language) is a markup language used by applications that require functions beyond the current HTML (HyperText Markup Language). XML developed by the World Wide Web consortium mainly has the following characteristic features:

1. An information provider can freely define new tags and attribute names.
2. A document can have any complex nested structure.
3. A description of syntax can be optionally embedded in an XML document, and an application can be made to verify the validity of structure using this syntax.

The description by XML shown in FIG. 8 can be written using a general-purpose text editor program. However, to generate a so-called "wellformed XML" in which, e.g., <PHOTO> and </PHOTO> or <ITEM> and </ITEM> correctly correspond, an XML editor program can be conveniently used.

[Write of Meta-Data in Storage Section or on Memory Card]

Figure 7:
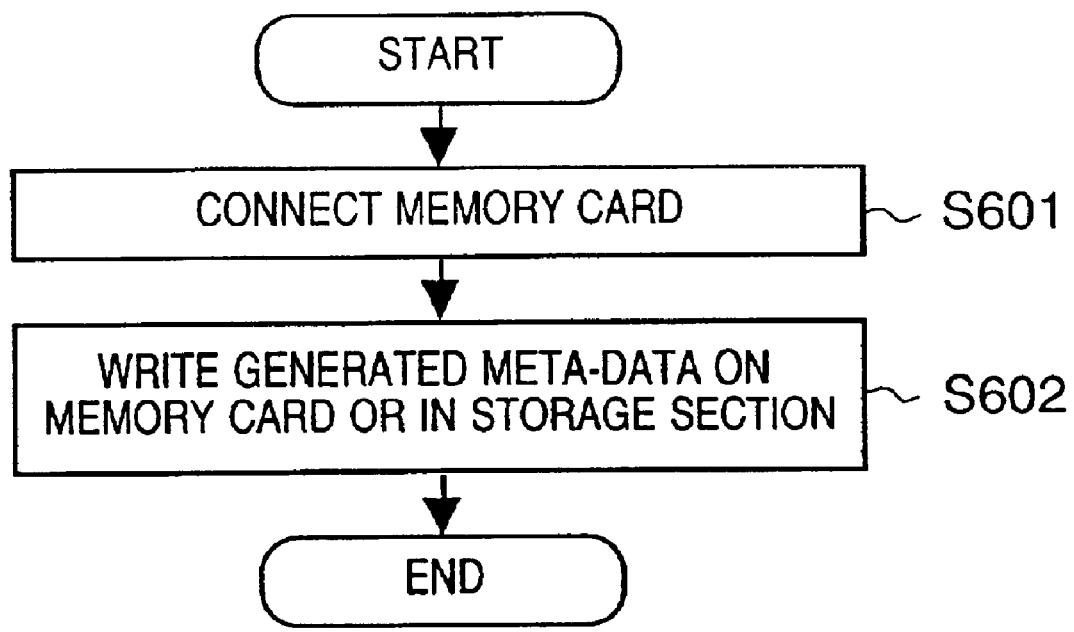
FIG. 7 is a flow chart of storage of generated meta-data in the first embodiment.

FIG. 7 is a flow chart showing processing of writing the meta-data shown in FIG. 8 in the storage section 102 or on the memory card 403, which is executed in step S405 shown in FIG. 5.

First, in step S601, to execute write processing on the memory card 403, the memory card 403 such as a PC card is inserted into the data input/output section 100. Alternatively, the recording apparatus 200 may be connected to the external device 107 through the input terminal of the data input/output section 100.

After completion of connection, in step S602, the meta-data generated in step S404 are written in the storage section 102 or on the memory card 403, and processing is ended.

[Processing of Linking Meta-Data to a Plurality of Binary Data]

Two processes of linking the above-described generated meta-data to binary data will be described next with reference to FIGS. 9 to 12. In the following description, still image data is used as binary data.

As the method of linking meta-data to binary data, 1) the first process of embedding the entire meta-data in still image data (FIG. 10A) and 2) the second process of attaching only meta-data linking information, for example file name, to still image data (FIG. 10B) will be described as examples.

Figure 10A:
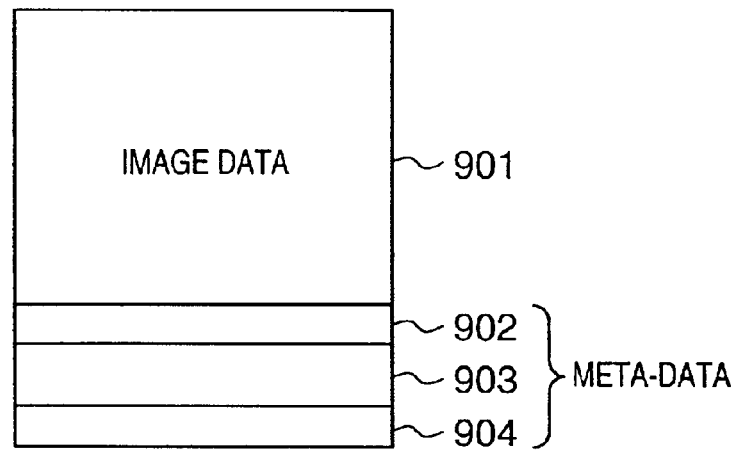
FIG. 10A shows the file structure of first image data having meta-data.

FIG. 10A shows a data structure in which meta-data generated by the recording apparatus 200 are embedded in and linked to image data. In the example shown in FIG. 10A, the generated meta-data are embedded in the image data file. The meta-data embedding position is not limited to that shown in FIG. 10A. The meta-data may be embedded in the header section of the image data.

Referring to FIG. 10A, reference numeral 901 denotes image data having, e.g., a JPEG compression format; 902, a meta-data header; 903, a meta-data body; and 904, a meta-data footer. The identification information and size of the meta-data are recorded in each of the meta-data header 902 and meta-data footer 904 to accurately recognize whether the meta-data is concatenated to the image data. The "CardInfo.xml" shown in FIG. 8 is recorded in the meta-data body 903.

When meta-data described as XML data is connected to the end of binary data, the meta-data can be registered without influencing other applications. More specifically, the information in the header section of binary data does not change from the state before connection of meta-data. For this reason, if the binary data is, e.g., image data, the image can be reproduced by a general browser. In this case, however, the connected meta-data is neglected.

Since the meta-data is described in the XML, many apparatuses capable of reading the XML format can read the information of meta-data, and the meta-data can be added, changed, or referred to using a tool for understanding the XML data, so it is excellent in versatility. As described above, when information that is known about image data is prepared as a meta-data template in advance, and meta-data is repeatedly attached to image data in image sensing, the time required to attach meta-data to the image data can be shortened.

Figure 10B:
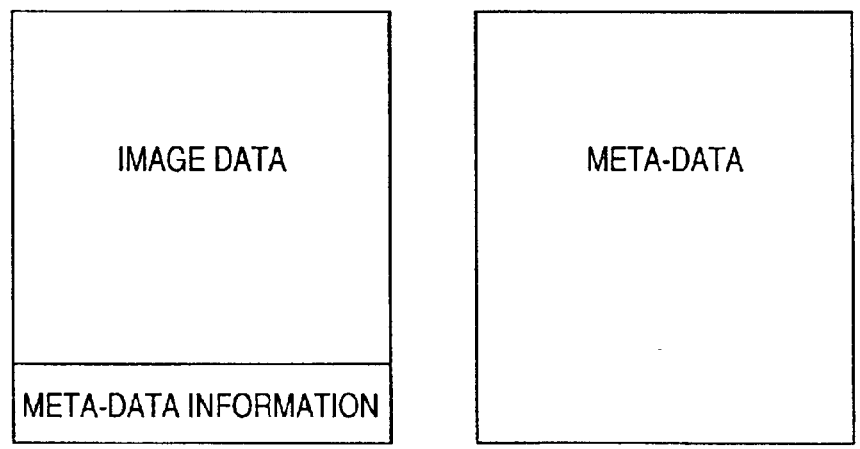
FIG. 10B shows the file structure of second image data having meta-data.

FIG. 10B is shows a data structure after the information of meta-data generated by the recording apparatus 200 is attached to image data to link the meta-data to the image data. In the example shown in FIG. 10B, only the meta-data file name is attached to the end of image data as the information of generated meta-data, and the meta-data file is independently present. The meta-data attachment position is not limited to that shown in FIG. 10B. The meta-data may be attached to the header section of the image data. In the example shown in FIG. 10B, the file name of generated meta-data is attached to the end of image data. However, information representing the location of meta-data file may be attached.

To record meta-data in image data, a standard called URL (Uniform Resource Locator) for specifying the physical location of data on the web or URN (Uniform Resource Name) for designating data using a unique name, or URI (Uniform Resource Identifier) as a standard currently under examination, inclusive of both the URL and URN, can be used. If the URI is widely used in the future, this can be optimally used to specify data on, e.g., the web. When JPEG is used to compress image data, an APP marker defined by the JPEG standard may be used to record meta-data.

Since the URI for specifying meta-data is recorded in image data, the image data and meta-data can be easily independently processed. Especially, the present invention can be widely used to, e.g., store meta-data on a network and read it using the URI. Additionally, when the URI of meta-data and that of image data have a predetermined association, the correspondence between the image data and the meta-data can be easily grasped. For example, the correspondence can be recognized by referring to the file name. The present invention can save memory capacity of storage media to avoid copying and string the same meta-data repeatedly.

A method of repeatedly linking the same meta-data generated by the recording apparatus 200 to a plurality of image data input or generated by image sensing to generate image data having meta-data will be described next with reference to FIGS. 11 and 12.

FIG. 11 is a schematic view showing an example in which the entire meta-data (file name: CardInfo.xml) is repeatedly copied and embedded in a plurality of still image data (file name: AUT_001.jpg, AUT_002.jpg, AUT_003.jpg, . . . ) input or generated by image sensing.

When image data (file name: AUT_001.jpg) and meta-data file (file name: CardInfo.xml) which are independently present, as shown by (before linking) in FIG. 11, are linked to each other by the recording apparatus 200, the entire information of the meta-data is copied and embedded at the end of the image data (file name: AUT_001.jpg), as shown by (after linking) in FIG. 11.

When the meta-data file (file name: CardInfo.xml) is linked to the second image data (file name: AUT_002.jpg) by the recording apparatus 200 in the same manner as described above, the entire information of the meta-data is copied and embedded at the end of the image data (file name: AUT_002.jpg). Thus, the same meta-data generated by the recording apparatus 200 is repeatedly linked to a plurality of image data.

FIG. 12 is a schematic view showing an example in which only the meta-data information (file name: CardInfo.xml) is repeatedly attached to a plurality of still image data (file name: AUT_001.jpg, AUT_002.jpg, AUT_003.jpg, . . . ) input or generated by image sensing.

When image data (file name: AUT_001.jpg) and meta-data file (file name: CardInfo.xml) which are independently present, as shown by (before linking) in FIG. 12, are linked to each other by the recording apparatus 200, information representing the meta-data file name (CardInfo.xml) is attached to the end of the image data, as shown by (after linking) in FIG. 12, so the image data is linked to the meta-data file (CardInfo.xml) that is actually present.

When the meta-data file (file name: CardInfo.xml) is linked to the second image data (file name: AUT_002.jpg) by the recording apparatus 200 in the same manner as described above, information representing the meta-data file name (CardInfo.xml) is attached to the end of the image data (file name: AUT_002.jpg), as shown by (after linking) in FIG. 12, Thus, the same meta-data generated by the recording apparatus 200 is repeatedly linked to a plurality of image data (file name: AUT_001.jpg, AUT_002.jpg, AUT_003.jpg, . . . .)

In the example shown in FIG. 12, linking processing of attaching only the file name of meta-data is performed, instead of embedding the meta-data itself in the image data. In place of the meta-data file name, information representing the storage location where the meta-data file is stored can be attached to the image data.

[Generation of Image Data Having Meta-Data]

Figure 9:
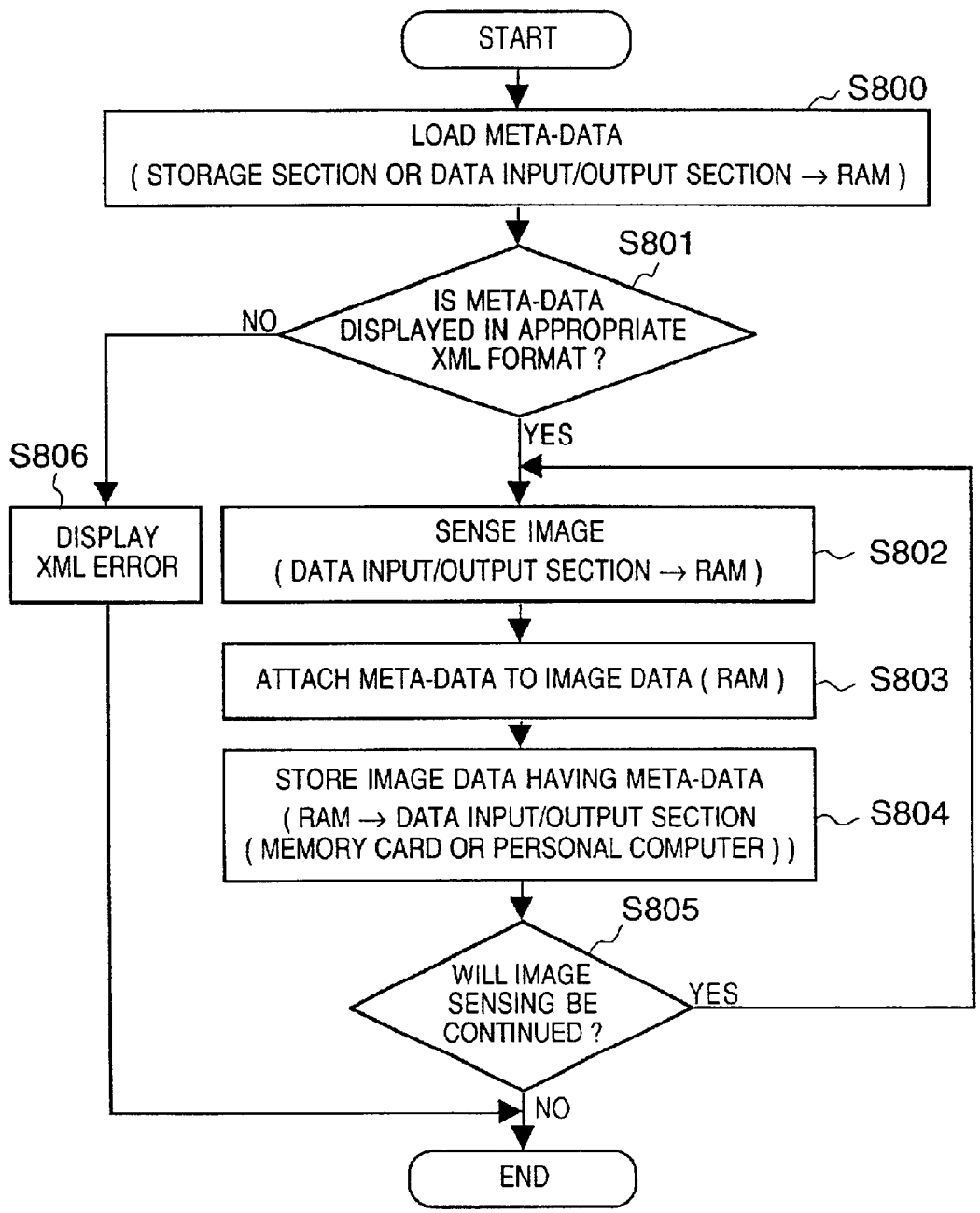
FIG. 9 is a flow chart showing generation and storage of image data having meta-data in the first embodiment.

Processing of linking meta-data to image data to generate image data having meta-data, as described with reference to FIG. 11 or 12, and storing the generated image data having meta-data, which is performed by the recording apparatus 200, will be described next with reference to the flow chart shown in FIG. 9. In the example to be described below, the same meta-data is repeatedly attached to each image sensed and converted into image data.

Instead of using the method to be described below, for example, a plurality of meta-data capable of explaining a plurality of image data to be sensed can be prepared in advance in correspondence with the plurality of image data, and the different meta-data can be selected and repeatedly attached to the sensed image data, respectively. First, in step S800, the above-described meta-data (CardInfo.xml) stored in the storage section 102 is loaded to the RAM 106. Alternatively, the above-described meta-data (CardInfo.xml) stored on the memory card 403 is loaded to the RAM 106 from the memory card 403 directly connected to the memory card slot 203 of the data input/output section 100. In the above example, one meta-data stored in the storage section 102 or on the memory card 403 is read out and used. However, a plurality of stored meta-data may be read out and used.

In step S801, it is checked whether the loaded meta-data is described by an appropriate XML format. If NO in step S801, the flow advances to step S806 to display an XML error, and the operation is ended. If YES in step S801, the flow advances to step S802.

In step S802, image data sensed through the CCD 108 is loaded to the RAM 106.

In step S803, the meta-data is linked to the image data to generate image data having meta-data. More specifically, when an instruction for linking the meta-data to the image data is issued (a process selected from the two processes described above), the meta-data is attached to the image data to generate image data having meta-data. For example, image data having meta-data shown in FIG. 10A or 10B is generated.

In step S804, the generated image data having meta-data is stored on the memory card 403 or in the storage section 102. This image data having meta-data may be stored both on the memory card 403 and in the storage section 102.

In step S805, if the user wants to continue image sensing, the flow returns to step S802 to continuously perform the above-described processing, thereby generating new image data having meta-data shown in FIG. 11 or 12. For example, in the case shown in FIG. 11, the same meta-data is repeatedly attached to a plurality of image data to obtain image data having meta-data (file name: AUT_002.jpg, AUT_003.jpg, . . . .) When the user ends image sensing, the series of operations are ended.

As described above, only by generating meta-data once, in advance, the meta-data can be repeatedly attached to image data obtained by image sensing to generate image data having meta-data. For this reason, operation of generating the image data having meta-data is facilitated. The generated meta-data can also be repeatedly attached to a plurality of different image data not obtained by image sensing but input from the memory card 403 to generate image data having meta-data.

A plurality of meta-data may be generated in advance and selected as needed such that meta-data of different types are attached to a plurality of image data. In this embodiment, still image data is used as binary data. Instead, voice data or moving image data may be used as binary data.

In step S804, the image data having meta-data is stored in, e.g., the storage section 102 or on the memory card 403 inserted into the data input/output section 100. However, the image data having meta-data may be stored on the memory card 403 as a first storage medium which had stored the original image data before meta-data attachment or another memory card as a second storage medium.

The image data having meta-data may be directly written in the external device 107 through the input terminal of the recording apparatus 200 or temporarily stored on the memory card 403 or in the storage section 102 and then written in the external device 107 through the memory card 403 or storage section 102.

The external device 107 and data input/output section 100 can be connected not directly as described above but by using a wireless channel. In this case, a wireless channel interface corresponding to the external device 107 is incorporated in the data input/output section 100.

Figure 13:
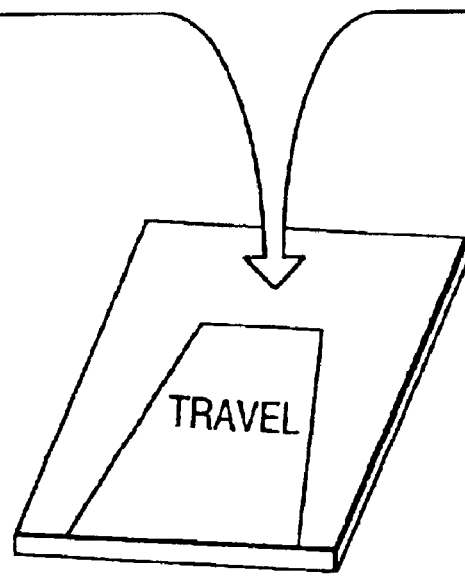
FIG. 13 is a view showing a meta-data file.

The meta-data may be generated in advance, as described above, or meta data prepared on a memory card in advance may be used. FIG. 13 is a view showing this example. In this example, for example, a memory card for travel is put on sale, and meta-data for travel which is stored on the memory card, in advance, is used. A memory card in which meta-data for moving images, meta-data for voice data, and meta-data for still images are prepared in advance in correspondence with binary data may be used.

[Second Embodiment]

As a recording apparatus of the second embodiment, a recording apparatus 2200 (FIG. 14) capable of loading binary data stored in a storage medium or the like, generating meta-data as information related to the binary data, and linking the generated meta-data to a plurality of loaded binary data to generate and output binary data each having meta-data will be described. In the following description, still image data is used as binary data.

[Hardware Configuration of Recording Apparatus]

Figure 14:
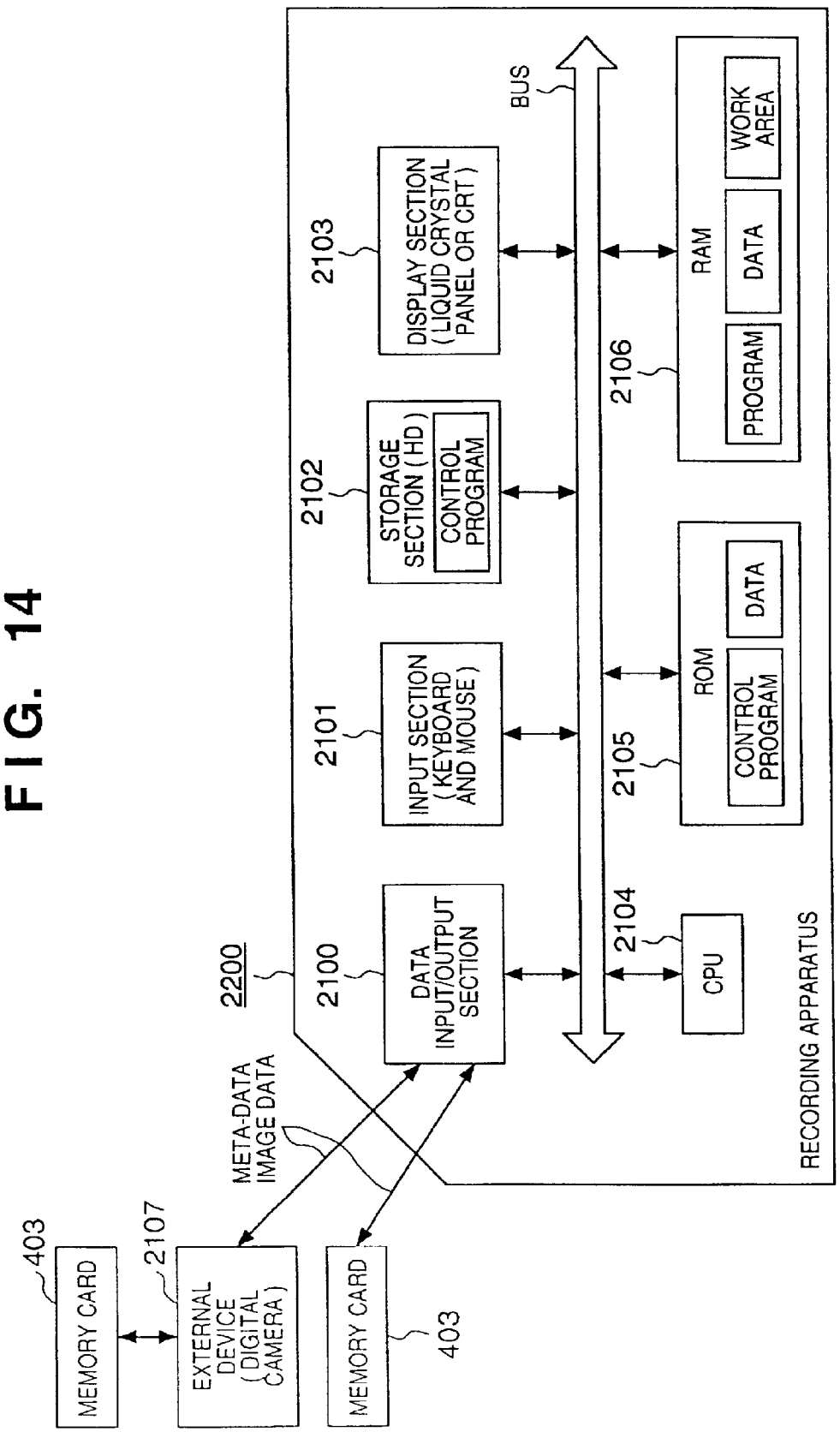
FIG. 14 is a block diagram showing a system configuration of a recording apparatus according to the second embodiment.

FIG. 14 is a block diagram showing the system configuration of the recording apparatus 2200.

Figure 16:
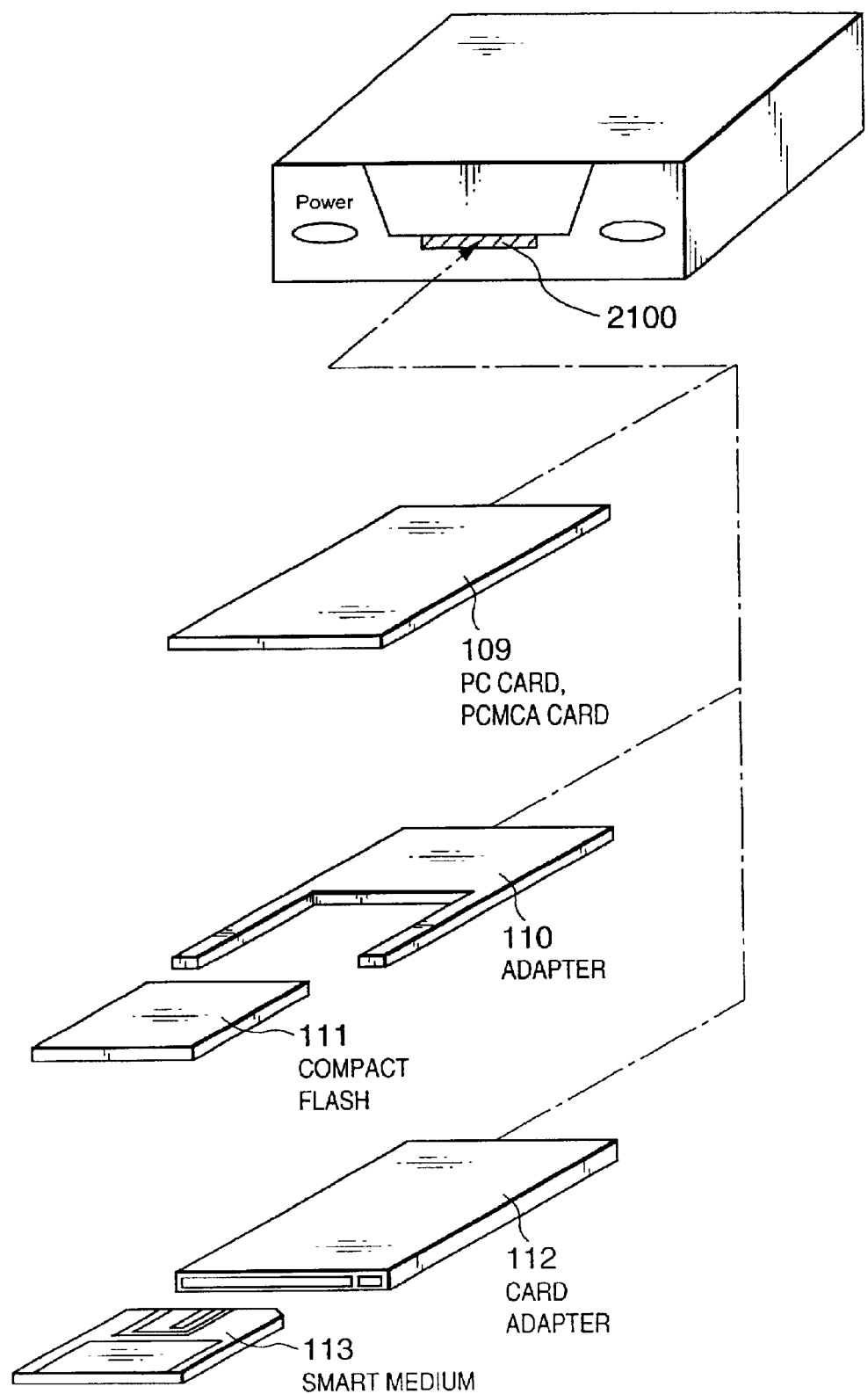
FIG. 16 is a view showing attachment of a memory card in the second embodiment.

A data input/output section 2100 inputs/outputs binary data or meta-data. As shown in FIG. 16, a memory card such as a PC card or PCMCIA card 109 is directly inserted. As shown in FIG. 16, a memory card such as a compact flash 111 or smart medium 113 is inserted via an adapter 110 or card adapter 112. Instead of a memory card, a removable strage medium (not shown) may be used.

The data input/output section 2100 is connected to an external device 2107 such as a digital camera via an input terminal such as a USB terminal, SCSI terminal, or parallel terminal. In the following description, a USB terminal is used as an input terminal.

Data (meta-data or binary data) recorded by the external device 2107 is directly loaded from the external device 2107 to the recording apparatus 2200 through an input terminal, or temporarily stored on a memory card 403 and then loaded to the recording apparatus 2200 through the memory card 403.

Conversely, data processed by the recording apparatus 2200 is directly written in the external device 2107 through an output terminal, or temporarily stored on the memory card 403 and then written in the external device 2107 through the memory card 403. The data processed by the recording apparatus 2200 is written in a storage section 2102. The external device 2107 and data input/output section 2100 can be connected not directly as described above but by using a wireless channel. In this case, a wireless channel interface corresponding to the external device 2107 is incorporated in the data input/output section 2100.

An input section 2101 inputs data or instructions from the user and is formed from, e.g., a keyboard, mouse, remote controller, and the like. The storage section 2102 stores binary data or meta-data and is formed from, e.g., a hard disk.

A display section 2103 displays a GUI or image data and is constructed by, e.g., a CRT or liquid crystal display.

A CPU 2104 controls the entire recording apparatus 2200. A ROM 2105 and RAM 2106 provide to the CPU 2104 a program, data, and work area necessary for processing by the CPU 2104.

Control programs necessary for processing operations shown in the flow charts of FIGS. 5, 6, 17, and 18 are stored in the storage section 2102 or ROM 2105. When the storage section 2102 stores a control program, it is temporarily loaded to the RAM 2106 and then executed.

Although the system configuration includes various components in addition to the above components, a detailed description thereof will be omitted because they are not main components of the present invention.

Figure 15B:
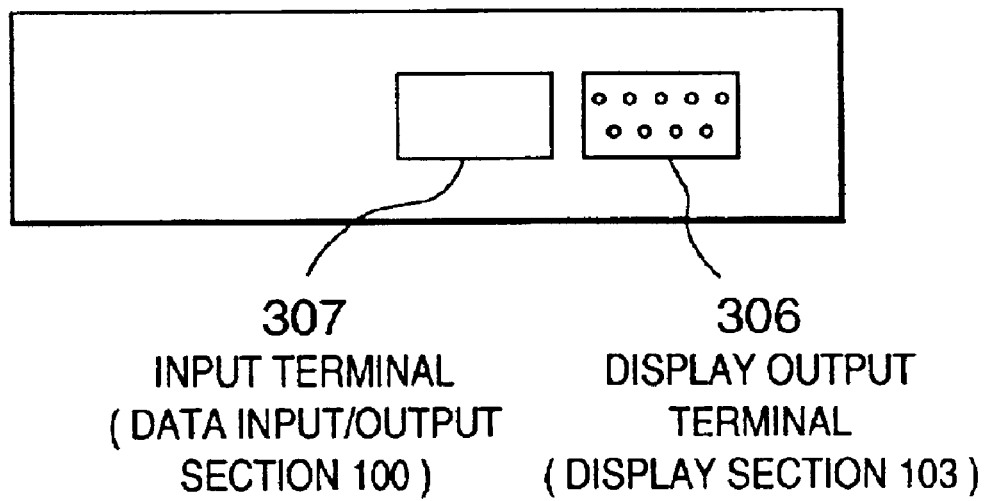
FIG. 15B is the rear view of the rear surface of the recording apparatus according to the second embodiment.

FIGS. 15A and 15B are views showing the outer appearance of the recording apparatus 2200. The front surface shown in FIG. 15A has a slot as one member of the data input/output section 2100, so data can be loaded into the recording apparatus 2200 through the memory card 403 inserted into the slot.

A power switch 2202 powers on/off the recording apparatus 2200. An infrared light-receiving section 2203 receives a signal from a wireless keyboard 2204 or remote controller 2205. The wireless keyboard 2204 and remote controller 2205 are used as members of the input section 2101.

The rear view shown in FIG. 15B has a display output terminal 2206 to which the display section 2103 such as a CRT or liquid crystal display is connected. To directly connect the recording apparatus to the external device 2107 such as a digital camera, a USB terminal 2307 as an input terminal or a member of the data input/output section 2100 is used. An input terminal such as a SCSI terminal (not shown) or parallel terminal (not shown) may be available at an arbitrary position on the front or rear surface of the recording apparatus 2200.

[Input of Meta-Data]

A series of operations of generating information of still image data as meta-data and storing it on the memory card 403 or the like using the recording apparatus 2200 will be described next in detail. First, an input method of registering meta-data will be described with reference to FIG. 4.

FIG. 4 is a view showing a GUI window used to register meta-data.

The GUI window has display/input sections 301 to 304 for displaying meta-data registered in advance or displaying newly generated meta-data, buttons 3011, 3021, 3031, and 3041 used to display lists of registered meta-data, "add" buttons 305, 307, and 308 for adding information input using the wireless keyboard 2204 or remote controller when no appropriate information is present in the displayed list and the user wants to add new information, a "change" button 306 for changing the date and time of image sensing of still image data input using the wireless keyboard 2204 and an "OK" button 309 for determining meta-data to be registered after the end of selection, addition, and change of meta-data to be registered.

A method of registering detailed items "Who?", "When?", "Where?", and "What?" as meta-data information of still image data using the GUI window shown in FIG. 4 will be described next.

Assume that "Who?" is "Taro", "When?" is "1999-6-14", "Where?" is "athletic park", and "What?" is "athletic meeting", and these meta-data are selected from lists or newly input and registered as meta-data.

"Who?" will be described first. When the button 3011 having an inverted triangular shape at the right end of the display/input section 301 is pressed, the first contents of the list registered for the button 3011 are displayed on the display/input section 301. When the button 3011 having an inverted triangular shape is pressed twice, the second contents of the list registered in advance for the button 3011 are displayed on the display/input section 301. Thus, the button 3011 is repeatedly pressed to search for "Taro" registered in the list in advance. If "Taro" is not present in the registered list, "Taro" is input using the wireless keyboard 2204, and the "add" button 305 is pressed to add "Taro" to the item "Who?".

"When?" will be described next. Upon activating the GUI window, the current date and time are displayed on the display/input section 302. If the date is different from the date of image sensing, the date of image sensing or "1999-06-14" is input using the wireless keyboard 2204, and then the "change" button 306 is pressed to add "1999-06-14" to the item "When?".

"Where?" will be described next. When the button 3031 having an inverted triangular shape at the right end of the display/input section 303 is pressed, the first contents of the list registered for the button 3031 in advance are displayed on the display/input section 303. When the button 3031 having an inverted triangular shape is pressed twice, the second contents of the list registered in advance for the button 3031 are displayed on the display/input section 303. Thus, the button 3031 is repeatedly pressed to search for "athletic park" registered in the list in advance. If "athletic park" is not present in the registered list, "athletic park" is input using the wireless keyboard 2204, and the "add" button 307 is pressed to add "athletic park" to the item "Where?".

"What?" will be described next. When the button 3041 having an inverted triangular shape at the right end of the display/input section 304 is pressed, the first contents of the list registered for the button 3041 in advance are displayed on the display/input section 304. When the button 3041 having an inverted triangular shape is pressed twice, the second contents of the list registered in advance for the button 3041 are displayed on the display/input section 304. Thus, the button 3041 is repeatedly pressed to search for "athletic meeting" registered in the list in advance. If "athletic meeting" is not present in the registered list, "athletic meeting" is input using the wireless keyboard 2204, and the "add" button 308 is pressed to add "athletic meeting" to the item "What?".

After all the items "Who?", "When?", "Where?", and "What?" are input, the "OK" button 309 is pressed to determine the set items, thereby ending meta-data registration.

As meta-data registration, only the method of displaying, selecting, and inputting the items "Who?", "When?", "Where?", and "What?" has been described above. A method of displaying, selecting, and inputting another item on the window can be added.

[Generation and Storage of Meta-Data]

A series of operations of generating meta-data and storing it on the memory card 403 or in the storage section 2102 using the recording apparatus 2200 will be described next in detail with reference to FIGS. 5, 6, 17, and 8.

FIG. 5 is a flow chart showing processing of generating meta-data and storing the generated meta-data on the memory card 403 by the recording apparatus 2200.

First, in step S401, list files "Who?", "When?", "Where?", and "What?" which are to be registered for the buttons 3011, 3021, 3031, and 3041 and displayed on the display/input sections 301 to 304 are loaded to the RAM 2106.

In step S402, the loaded lists are displayed on the GUI window shown in FIG. 4.

In step S403, the user inputs meta-data "Who?", "When?", "Where?", and "What?" to the display/input sections 301 to 304, respectively. The input method has already been described above in detail with reference to FIG. 4, and a detailed description thereof will be omitted.

In step S404, when the "OK" button 309 shown in FIG. 4 is pressed, a meta-data file is generated on the basis of the input meta-data using a data description language, i.e., a markup language such as the XML shown in FIG. 8.

In the example shown in FIG. 8, the input meta-data are registered as a meta-data file with a file name: "CardInfo.xml". To describe the meta-data, a markup language XML is used. Instead of the XML, the SGML or HTML can be used.

In step S405, the generated meta-data file is written on the memory card 403 through the data input/output section 2100 and stored with the file name: "CardInfo.xml". Write processing on the memory card 403 or in the storage section 2102 will be described later in detail with reference to FIG. 17, and a detailed description thereof will be omitted. The generated meta-data file is also stored in the storage section 2102 of the recording apparatus 2200, as needed.

In the above-described example, one meta-data file is generated. However, a plurality of meta-data files may be generated. In this case, a meta-data file can be repeatedly generated to generate a plurality of meta-data files.

[Generation of Meta-Data File]

FIG. 6 is a flow chart showing meta-data file generation executed by the recording apparatus 2200 in step S404 on the basis of the input value of meta-data input by the user in step S403.

First, in step S501, it is checked whether the button 3011, 3021, 3031, or 3041 is pressed. If NO in step S501, processing waits until input is detected. If YES in step S501, the flow advances to step S502. When any one of the buttons 305 to 308 is pressed, the flow advances to step S503. When the button 309 is pressed, the flow advances to step S504.

When step S502 is selected, the contents of a list corresponding to one of the list display buttons 3011, 3021, 3031, and 3041 are displayed, and the flow advances to step S505. When the list file displayed in correspondence with one of the list display buttons 3011, 3021, 3031, and 3041 is selected, the flow advances to step S506. After the selected item is copied to the input area, the flow returns to step S501. When the displayed list file is not selected in step S505, the flow returns to step S501 without any processing.

When step S503 is selected, it is checked whether the "add" button 305, 307, or 308 is pressed or whether the "change" button 306 is pressed. When the "add" button 305, 307, or 308 is pressed, the flow advances to step S507. After the contents of the display/input section, which are added by the user using the keyboard, are added to a corresponding list file, the flow advances to step S508. When the "change" button 306 is pressed, the flow advances to step S508 without any processing. In step S508, the date and time in the list file are changed to the contents on the display/input section, and the flow returns to step S501.

When step S504 is selected, and the "OK" button is pressed, a meta-data file is generated, and the series of operations are ended.

Thus, the meta-data file shown in FIG. 8 is generated.

In the above-described example, the user inputs meta-data using the wireless keyboard 2204. As another input method, an arbitrary input method such as voice input from a remote controller using a G code, input using voice recognition, or input from an external device through a network can be used.

FIG. 8 will be described. To describe meta-data, the XML is used. The XML (eXtensible Markup Language) is a markup language used by applications that require functions beyond the current HTML (HyperText Markup Language). The XML developed by the World Wide Web consortium mainly has the following characteristic features.

1. An information provider can freely define new tags and attribute names.
2. A document can have any complex nested structure.
3. A description of syntax can be optionally embedded in an XML document, and an application can be made to verify the validity of structure using this syntax.

The description by the XML shown in FIG. 8 can be written using a general-purpose text editor program. However, to generate a so-called "wellformed XML" in which, e.g., <PHOTO>and </PHOTO>or <ITEM>and </ITEM>correctly correspond, an XML editor program can be conveniently used.

[Write of Meta-Data on Memory Card]

Figure 17:
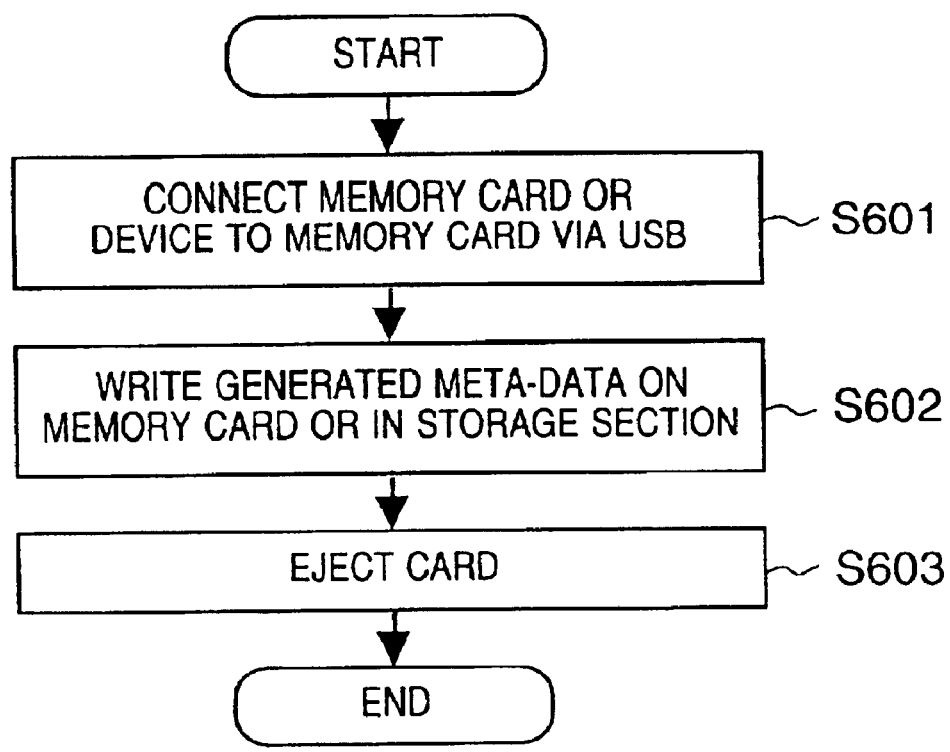
FIG. 17 is a flow chart of storage of generated meta-data in the second embodiment.

FIG. 17 is a flow chart showing processing of writing the meta-data shown in FIG. 8 in the storage section 2102 or on the memory card 403, which is executed in step S405 shown in FIG. 5.

First, in step S601, to execute write processing on the memory card 403, the memory card 403 such as a PC card is inserted into the data input/output section 2100. Alternatively, the recording apparatus 2200 may be connected to the memory card 403 inserted into the external device 2107 through the input terminal of the data input/output section 2100.

After completion of connection, in step S602, the meta-data generated in step S404 is written on the memory card 403.

In step S603, if the apparatus has an ejection function for the memory card 403, the memory card 403 is ejected, and processing is ended.

In the above-described example, to write meta-data on the memory card 403, the meta-data is written on the memory card 403 which is directly inserted and connected to the data input/output section 2100, or the meta-data is written, through the input terminal, on the memory card 403 inserted into the external device 2107. Any other connection method such as wireless connection as described above can be used as long as the memory card 403 is accessible. The meta-data can also be written in the storage section 2102.

[Meta-Data Linking Processing to a Plurality of Binary Data]

Two processes of linking the above-described generated meta-data to binary data will be described next with reference to FIG. 18 and FIGS. 10 to 12. In the following description, still image data is used as binary data.

As the method of linking meta-data to binary data, 1) the first process of embedding all the meta-data in still image data (FIG. 10A) and 2) the second process of attaching only meta-data information to still image data (FIG. 10B) will be described as examples.

FIG. 10A is a schematic view showing a data structure in which meta-data generated by the recording apparatus 2200 are embedded in and linked to image data. In the example shown in FIG. 10A, the generated meta-data are embedded following the image data. The meta-data embedding position is not limited to that shown in FIG. 10A. The meta-data may be embedded in the header section of the image data.

Referring to FIG. 10A, reference numeral 901 denotes image data having, e.g., a JPEG compression format; 902, a meta-data header; 903, a meta-data body; and 904, a meta-data footer. The identification information and size of the meta-data are recorded in each of the meta-data header 902 and meta-data footer 904 to accurately recognize whether the meta-data is linked to the image data. The "CardInfo.xml" shown in FIG. 8 is recorded in the meta-data body 903.

When meta-data described as XML data is connected to the end of binary data, the meta-data can be registered without influencing other applications. More specifically, the information in the header section of binary data does not change from the state before connection of meta-data. For this reason, if the binary data is, e.g., image data, the image can be reproduced by a general browser. In this case, however, the connected meta-data is neglected.

Since the meta-data is described in the XML, many apparatuses capable of reading the XML format can read the information of meta-data, and the meta-data can be added, changed, or referred to using a tool for understanding the XML data, so it is excellent in versatility. As described above, when information that is known about image data is prepared as a meta-data template in advance, and meta-data is repeatedly attached to image data, the time required to attach meta-data to the image data can be shortened.

FIG. 10B is a schematic view showing a data structure after the information of meta-data generated by the recording apparatus 2200 is attached to image data to link the meta-data to the image data. In the example shown in FIG. 10B, only the meta-data file name (CardInfo.xml) is attached to the end of image data as the information of generated meta-data, and the meta-data file is independently present. The meta-data attachment position is not limited to that shown in FIG. 10B. The meta-data may be attached to the header section of the image data. In the example shown in FIG. 10B, the file name of generated meta-data is attached to the end of image data. However, information representing the location of meta-data file may be attached.

To record meta-data in image data, a standard called URL (Uniform Resource Locator) for specifying the physical location of data on the web or URN (Uniform Resource Name) for designating data using a unique name, or URI (Uniform Resource Identifier) as a standard currently under examination, inclusive of both the URL and URN, can be used. If the URI will be widely used in the future, this can be optimally used to specify data on, e.g., the web. When JPEG is used to compress image data, an APP marker defined by the JPEG standard may be used to record meta-data.

Since the URI for specifying meta-data is recorded in image data, the image data and meta-data can be easily independently processed. Especially, the present invention can be widely used to, e.g., store meta-data on a network and read it using the URI. Additionally, when the URI of meta-data and that of image data have a predetermined association, the correspondence between the image data and the meta-data can be easily grasped. For example, the correspondence can be recognized by referring to the file name. The present invension can save memory capacity of strage media to avoid copying and storing the same meta-data repeatly.

A method of repeatedly linking the same meta-data generated by the recording apparatus 2200 to a plurality of input image data to generate image data having meta-data will be described next with reference to FIGS. 11 and 12.

FIG. 11 is a schematic view showing an example in which the whole meta-data (file name: CardInfo.xml) is repeatedly copied and embedded in a plurality of input still image data (file name: AUT_001.jpg, AUT_002.jpg, AUT_003.jpg, . . . .)

When image data (file name: AUT_001.jpg) and meta-data file (file name: CardInfo.xml) which are independently present, as shown by (before linking) in FIG. 11, are linked to each other by the recording apparatus 2200, the whole information of the meta-data is copied and embedded at the end of the image data (file name: AUT_001.jpg), as shown by (after linking) in FIG. 11.

When the meta-data file (file name: CardInfo.xml) is linked to the second image data (file name: AUT_002.jpg) by the recording apparatus 2200 in the same manner as described above, the whole information of the meta-data is copied and embedded at the end of the image data (file name: AUT_002.jpg). Thus, the same meta-data generated by the recording apparatus 2200 is repeatedly linked to a plurality of image data.

FIG. 12 is a schematic view showing an example in which only meta-data information (file: CardInfo.xml) is repeatedly attached to a plurality of input still image data (file name: AUT_001.jpg, AUT_002.jpg, AUT_003.jpg, . . . .)

When image data (file name: AUT_001.jpg) and meta-data file (file name: CardInfo.xml) which are independently present, as shown by (before linking) in FIG. 12, are linked to each other by the recording apparatus 2200, information representing the meta-data file name (CardInfo.xml) is attached to the end of the image data, as shown by (after linking) in FIG. 12, so the image data is linked to the meta-data file (CardInfo.xml) that is actually present.

When the meta-data file (file name: CardInfo.xml) is linked to the second image data (file name: AUT_002.jpg) by the recording apparatus 2200 in the same manner as described above, information representing the meta-data file name (CardInfo.xml) is attached to the end of the image data (file name: AUT_002.jpg), as shown by (after linking) in FIG. 12, Thus, the same meta-data generated by the recording apparatus 2200 is repeatedly linked to a plurality of image data.

In the example shown in FIG. 12, linking processing of attaching only the file name of meta-data is performed, instead of embedding the meta-data itself in the image data.

In place of the meta-data file name, information representing the storage location where the meta-data file is stored can be attached to the image data.

[Generation of Image Data Having Meta-Data]

Figure 18:
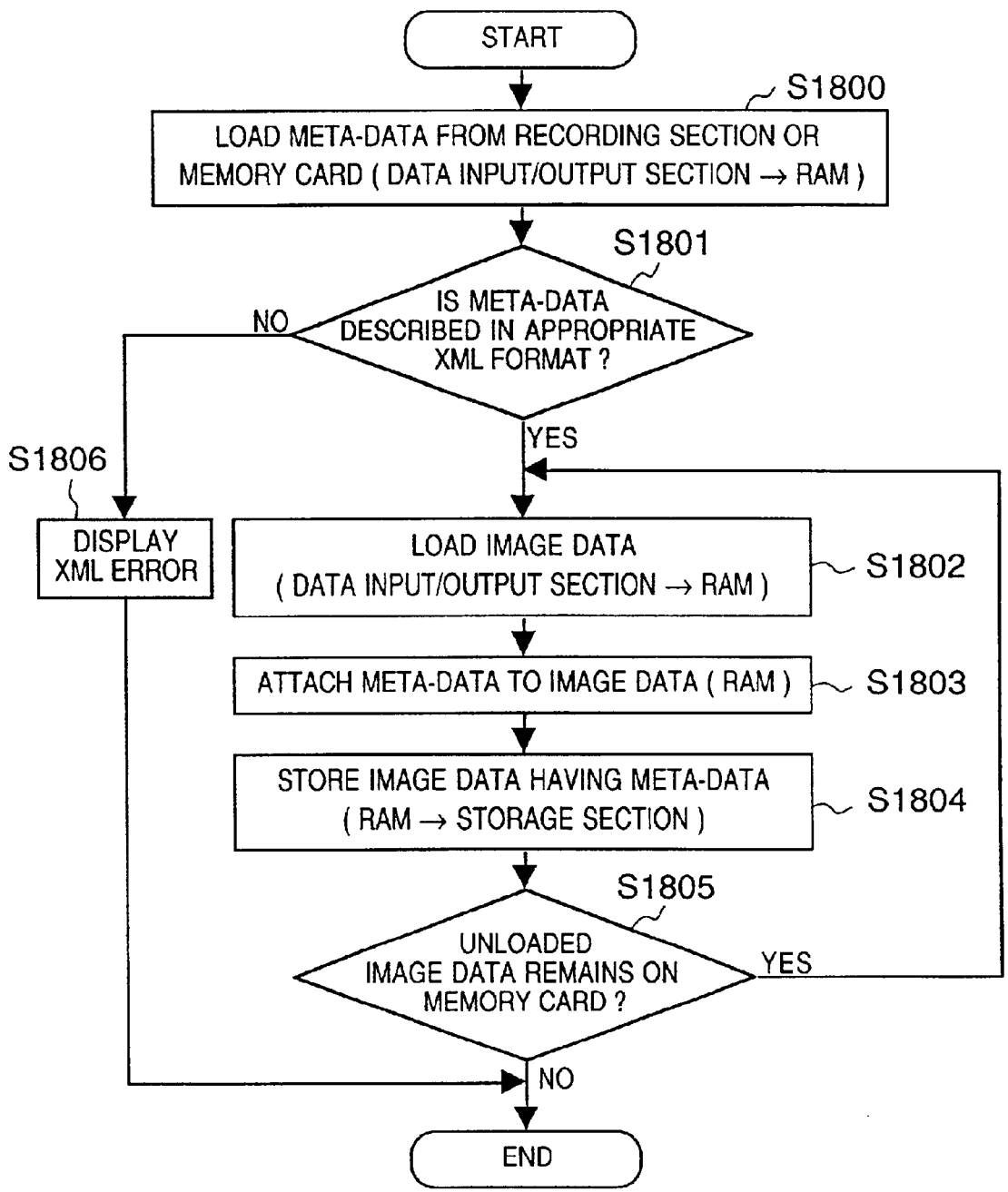
FIG. 18 is a view for explaining the process of generating image data having meta-data in the second embodiment.

Processing of linking meta-data to image data to generate image data having meta-data, as described with reference to FIG. 11 or 12, and storing the generated image data having meta-data, which is performed by the recording apparatus 2200, will be described next with reference to the flow chart shown in FIG. 18. In the example to be described below, the same meta-data is attached to all image data stored on the memory card 403 at once.

Instead of using the method to be described below, for example, the same meta-data can be attached to a plurality of selected image data. Different meta-data can be attached to a plurality of selected image data, respectively. Image data stored in the memory of the external device 2107 may be used.

First, in step S1800, the above-described meta-data (CardInfo.xml) stored in the storage section 2102 is loaded to the RAM 2106. Alternatively, the above-described meta-data (CardInfo.xml) stored on the memory card 403 is loaded to the RAM 2106 from the memory card 403 directly connected to the data input/output section 2100 or the memory card 403 inserted into the external device 2107 connected through the input terminal. In the above example, one meta-data stored on the memory card 403 is read out and used. However, a plurality of stored meta-data may be read out and used. The meta-data remaining on the memory card 403 is erased after it is loaded to the RAM 2106.

In step S1801, it is checked whether the loaded meta-data is described by an appropriate XML format. If NO in step S1801, the flow advances to step S1806 to display an XML error, and the operation is ended. If YES in step S1801, the flow advances to step S1802.

In step S1802, image data is loaded from the memory card 403 to the RAM 2106 through the data input/output section 2100. The image data loaded from the memory card is erased from the memory card 403.

In step S1803, the meta-data is linked to the image data to generate image data having meta-data. More specifically, when an instruction for linking the meta-data to the image data is issued (a process selected from the two processes described above), the meta-data is attached to the image data to generate image data having meta-data. For example, image data having meta-data shown in FIG. 10A or 10B is generated.

In step S1804, the generated image data having meta-data is stored on the memory card 403 or in the storage section 2102. This image data having meta-data may be stored both on the memory card 403 and in the storage section 2102.

In step S1805, it is determined whether unloaded image data remains on the memory card 403. If YES in step S1805, the flow returns to step S1802 to continuously perform the above-described processing, thereby generating new image data having meta-data shown in FIG. 11 or 12. For example, in the case shown in FIG. 11, the same meta-data is repeatedly attached to a plurality of image data to obtain image data having meta-data (file name: AUT_002.jpg, AUT_003.jpg, . . . .)

On the other hand, if it is determined in step S1805 that loading of all image data on the memory card 403 and meta-data attachment to each image data are completed, the series of operations are terminated.

As described above, only by generating meta-data once in advance, the meta-data can be repeatedly attached to a plurality of different image data input from the memory card 403. For this reason, the operation of attaching the meta-data to image data is facilitated. A plurality of meta-data may be generated in advance and selected as needed such that meta-data of different types are attached to a plurality of image data. In this embodiment, still image data is used as binary data. Instead, voice data or moving image data may be used as binary data.

In step S1802, image data are loaded from the memory card 403 to the RAM 2106 one by one, and each image data which has been loaded is erased from the card 403. Instead, all image data may be sequentially loaded from the memory card 403 to the RAM 2106, and the image data which have been loaded may be erased at once.

In step S1804, the image data having meta-data is stored in, e.g., the storage section 2102 or on the memory card 403 inserted into the data input/output section 2100. However, the image data having meta-data may be stored on the memory card 403 as a first storage medium which stores image data before meta-data attachment or another memory card as a second storage medium.

The image data having meta-data may be directly written in the external device 2107 through the output terminal of the recording apparatus 2200 or temporarily stored on the memory card 403 or in the storage section 2102 and then written in the external device 2107 through the memory card 403 or storage section 2102.

The external device 2107 and data input/output section 2100 can be connected not directly as described above but using a-wireless channel. In this case, a wireless channel interface corresponding to the external device 2107 is prepared in the data input/output section 2100.

The meta-data may be generated in advance, as described above, or meta-data prepared on a memory card in advance may be used. FIG. 13 is a view showing this example. In this example, for example, a memory card for travel is put on sale, and meta-data for travel which is stored on the memory card in advance is used. A memory card in which meta-data for moving images, meta-data for voice data, and meta-data for still images are prepared in advance in correspondence with binary data may be used.

[Third Embodiment (1)]

As a first recording apparatus according to the third embodiment, a recording apparatus 3200 (see FIG. 20) capable of loading meta-data stored in a storage medium or the like, generating still image data as binary data, and linking the loaded meta-data to a plurality of generated binary data to generate and output binary data each having meta-data will be described. The meta-data is generated by a dedicated meta-data generation apparatus 4000 (see FIG. 19) and supplied to the recording apparatus 3200 through a portable storage medium or the like.

[Hardware Configuration of Meta-Data Generation Apparatus and Recording Apparatus]

Figure 19:
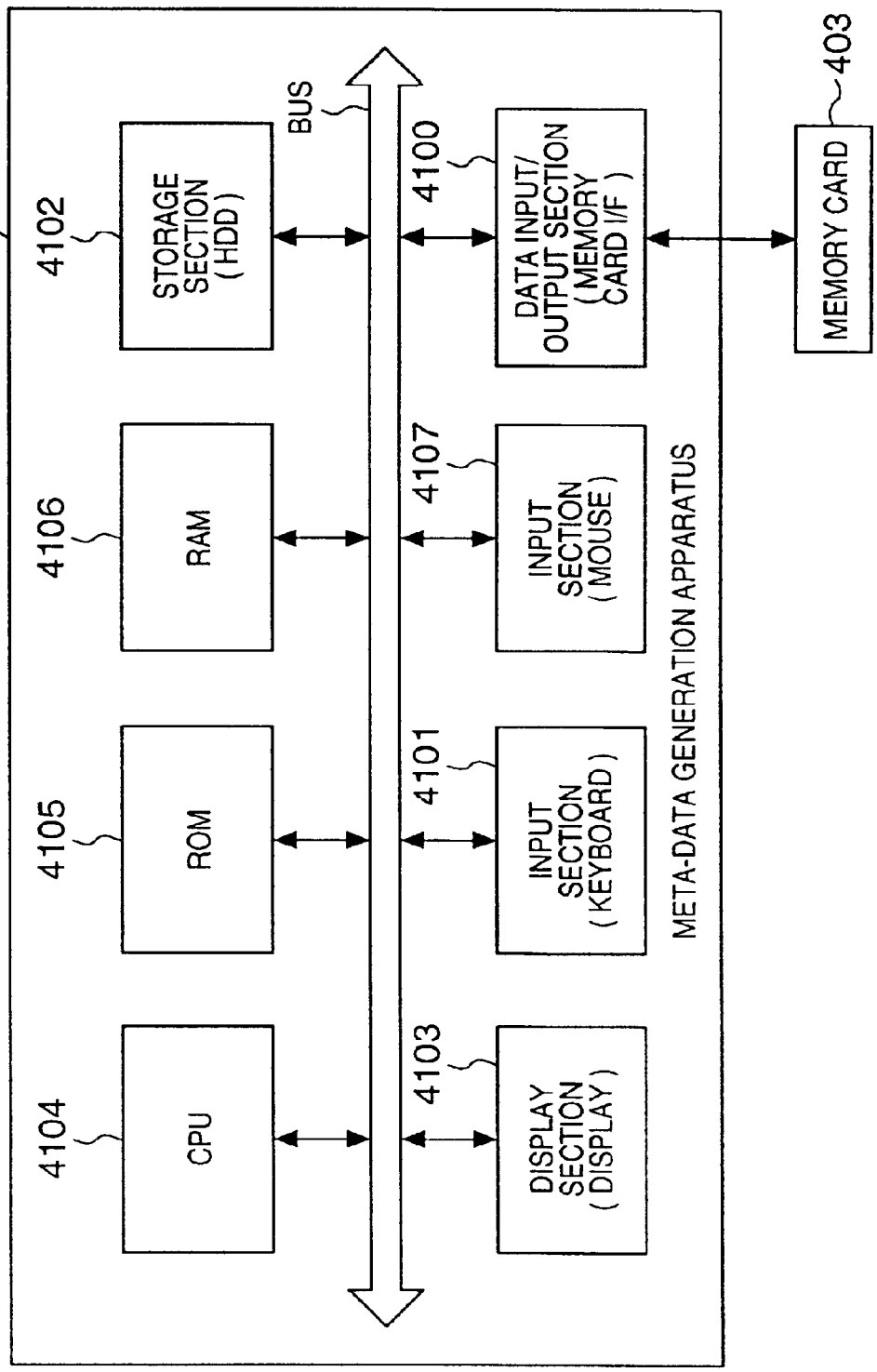
FIG. 19 is a block diagram showing the system configuration of a meta-data generation apparatus according to the third embodiment.
Figure 20:
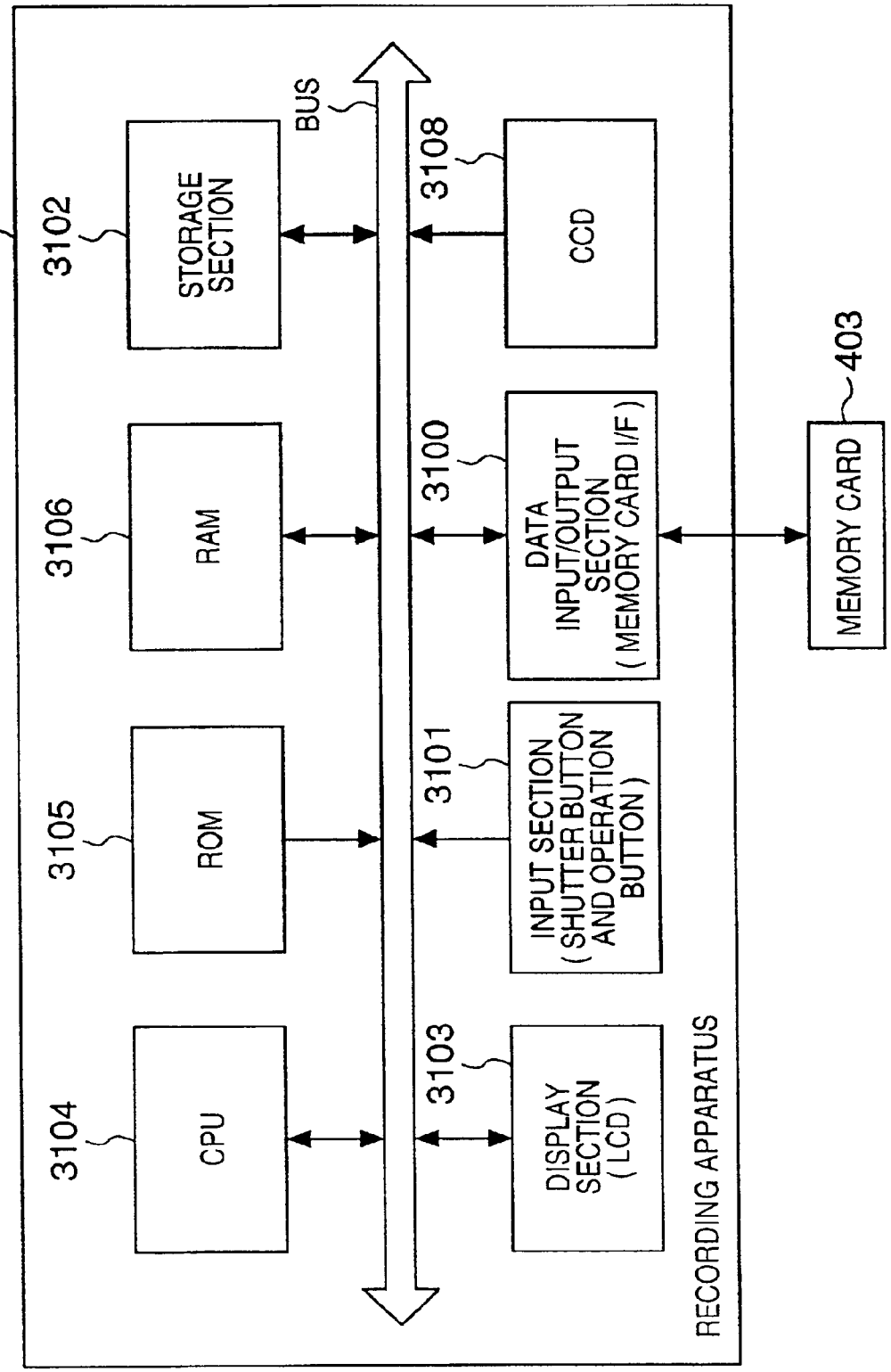
FIG. 20 is a block diagram showing the system configuration of a first recording apparatus according to the third embodiment.

FIGS. 19 and 20 are block diagrams showing the system configurations of the meta-data generation apparatus 4000 and recording apparatus 3200.

Figure 25:
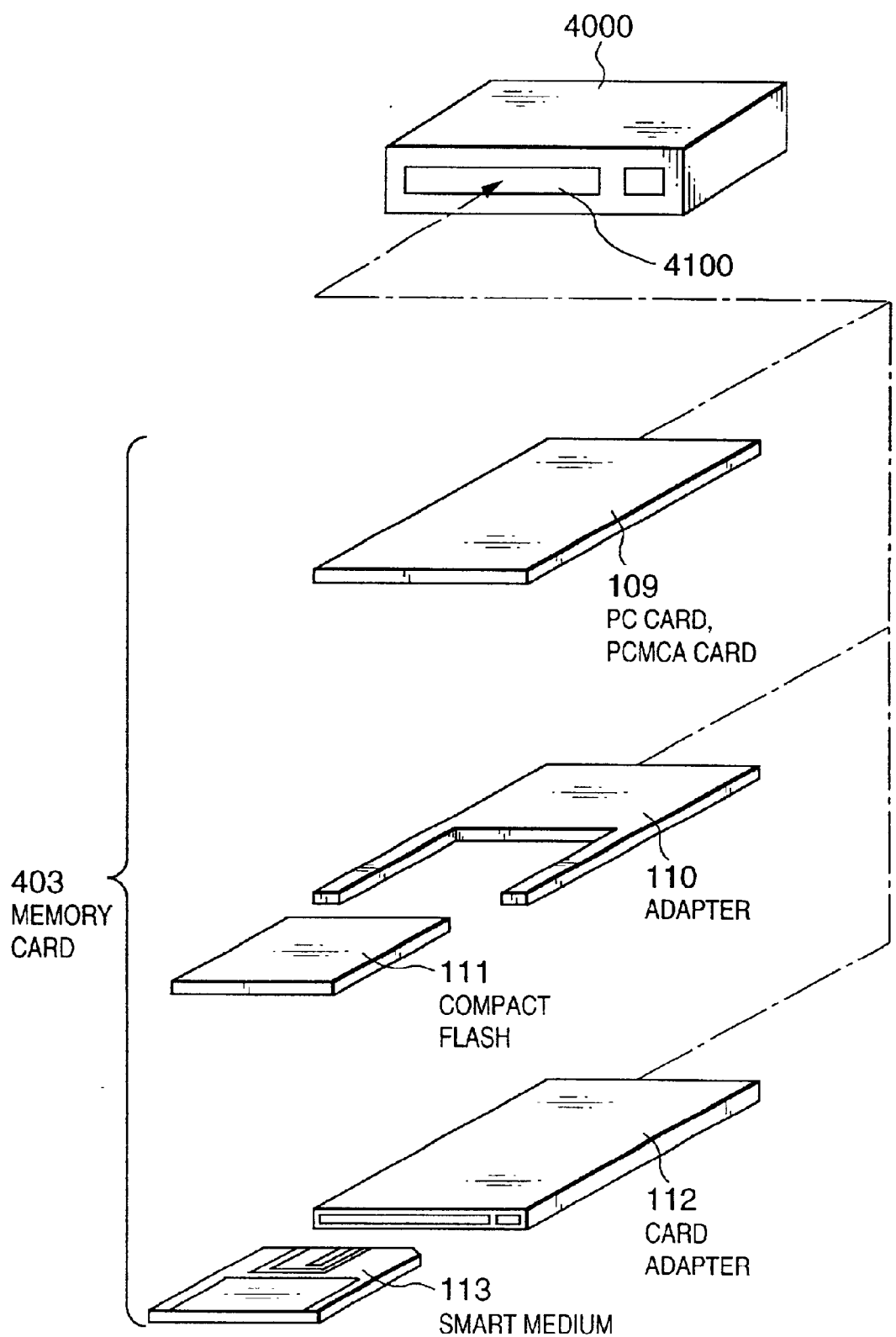
FIG. 25 is a view showing attachment of a memory card in the third embodiment.

A data input/output section 4100 inputs/outputs data (binary data or meta-data). As shown in FIG. 25, a memory card 403 such as a PC card or PCMCIA card 4109 is directly inserted into the slot. As shown in FIG. 25, the memory card 403 such as a compact flash 4111 or smart medium 4113 is inserted into the slot via an adapter 4110 or card adapter 4112. Instead of the memory card 403, a removable medium (not shown) may be used.

The meta-data generation apparatus 4000 is directly connected to the recording apparatus 3200 via the input terminal of the data input/output section 4100, such as a USB terminal, SCSI terminal, or parallel terminal. In the following description, a USB terminal is used as an input terminal. Data output from the meta-data generation apparatus 4000 is directly loaded from the meta-data generation apparatus 4000 to the recording apparatus 3200 through the input terminal, or temporarily stored on the memory card 403 and then loaded to the recording apparatus 3200 through the memory card 403.

Conversely, data processed by the recording apparatus 3200 is directly written in the meta-data generation apparatus 4000 through the input terminal, or temporarily stored on the memory card 403 and then written in the meta-data generation apparatus 4000 through the memory card 403. The recording apparatus 3200 and data input/output section 4100 can be connected not directly as described above but using a wireless channel. In this case, a wireless channel interface is prepared in the data input/output section 4100.

Input sections 4101 and 4107 input data or an instruction from the user and is comprised of, e.g., a keyboard, mouse, remote controller, and the like. The storage section 4102 stores data and is formed from, e.g., a hard disk.

A display section 4103 displays a GUI or image and is constructed by, e.g., a CRT or liquid crystal display. A CPU 4104 controls the entire meta-data generation apparatus 4000. A ROM 4105 and RAM 4106 provide to the CPU 4104 a program, data, and work area necessary for processing by the CPU 4104.

Necessary control programs are stored in the storage section 4102 or ROM 4105. When the storage section 4102 stores a control program, it is temporarily loaded to the RAM 4106 and then executed.

Although the system configuration includes various components in addition to the above components, a detailed description thereof will be omitted because they are not main components of the present invention.

Figure 27B:
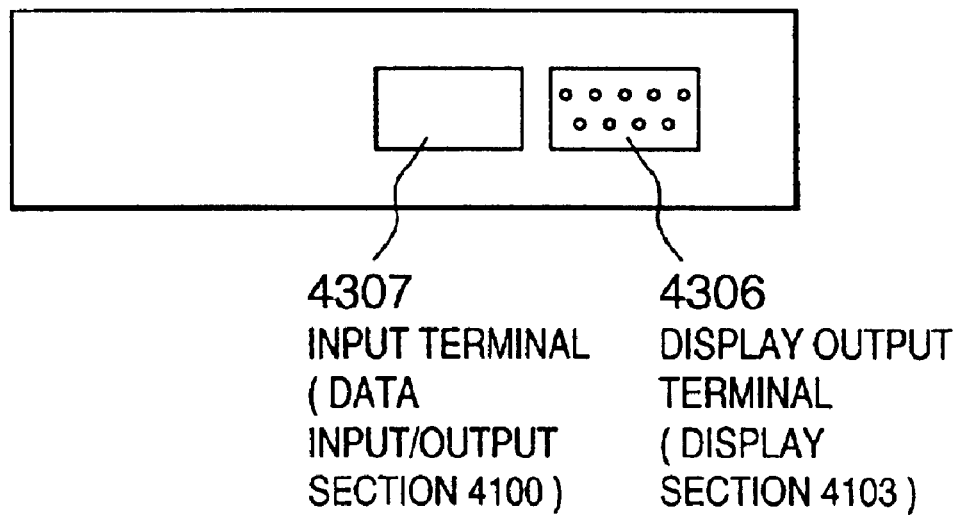
FIG. 27B is the rear view of the rear surface of the meta-data generation apparatus according to the third embodiment.

FIGS. 27A and 27B are views showing the outer appearance of the meta-data generation apparatus 4000. The front surface shown in FIG. 27A has a memory card slot as one member of the data input/output section 4100, so data can be loaded into the meta-data generation apparatus 4000 through the memory card 403 inserted into the slot.

A power switch 4202 powers on/off the meta-data generation apparatus 4000. An infrared light-receiving section 4203 receives a signal from a wireless keyboard 4204 or remote controller 4205 as one member of the input section.

The rear surface shown in FIG. 27B has a display output terminal 4306 to which the display section 4163 such as a CRT or liquid crystal display is connected. To directly connect the meta-data generation apparatus 4000 to the recording apparatus 3200, a USB terminal as an input terminal 4307 or a member of the data input/output section 4100 is used. As the input terminal 4307, a SCSI terminal (not shown) or parallel terminal (not shown) maybe prepared at an arbitrary position on the front or rear surface of the meta-data generation apparatus 4000.

The recording apparatus 3200 will be described next with reference to FIG. 20.

A data input/output section 3100 inputs/outputs data (binary data or meta-data). The structure of a memory card slot as one member of the data input/output section 3100 is the same as that described with reference to FIG. 25, and a detailed description thereof will be omitted.

The recording apparatus 3200 is directly connected to the meta-data generation apparatus 4000 via an input terminal such as a USB terminal, SCSI terminal, or parallel terminal as one member of the data input/output section 3100. In the following description, a USB terminal is used as an input terminal.

Data (binary data or meta-data) recorded by the meta-data generation apparatus 4000 is directly loaded from the meta-data generation apparatus 4000 to the recording apparatus 3200 through the input terminal, or temporarily stored on the memory card 403 and then loaded to the recording apparatus 3200 through the memory card 403. Conversely, data processed by the recording apparatus 3200 is directly written in the meta-data generation apparatus 4000 through the input terminal, or temporarily stored on the memory card 403 and then written in the meta-data generation apparatus 4000 through the memory card 403. Data processed by the recording apparatus 3200 is written in a storage section 3102. The meta-data generation apparatus 4000 and data input/output section 3100 can be connected not directly as described above but using a wireless channel. In this case, a wireless channel interface is prepared in the data input/output section 3100.

An input section 3101 inputs data or an instruction from the user and is formed from, e.g., operation buttons, shutter button, and the like. The storage section 3102 stores data and is formed from, e.g., a hard disk. A display section 3103 displays a GUI or image and is constructed by, e.g., a CRT or liquid crystal display.

A CPU 3104 controls the entire recording apparatus 3200. A ROM 3105 and RAM 3106 provide to the CPU 3104 a program, data, and work area necessary for processing by the CPU 3104. Necessary control programs are stored in the storage section 3102 or ROM 3105. When the storage section 3102 stores a control program, it is temporarily loaded to the RAM 3106 and then executed.

Figure 28A:
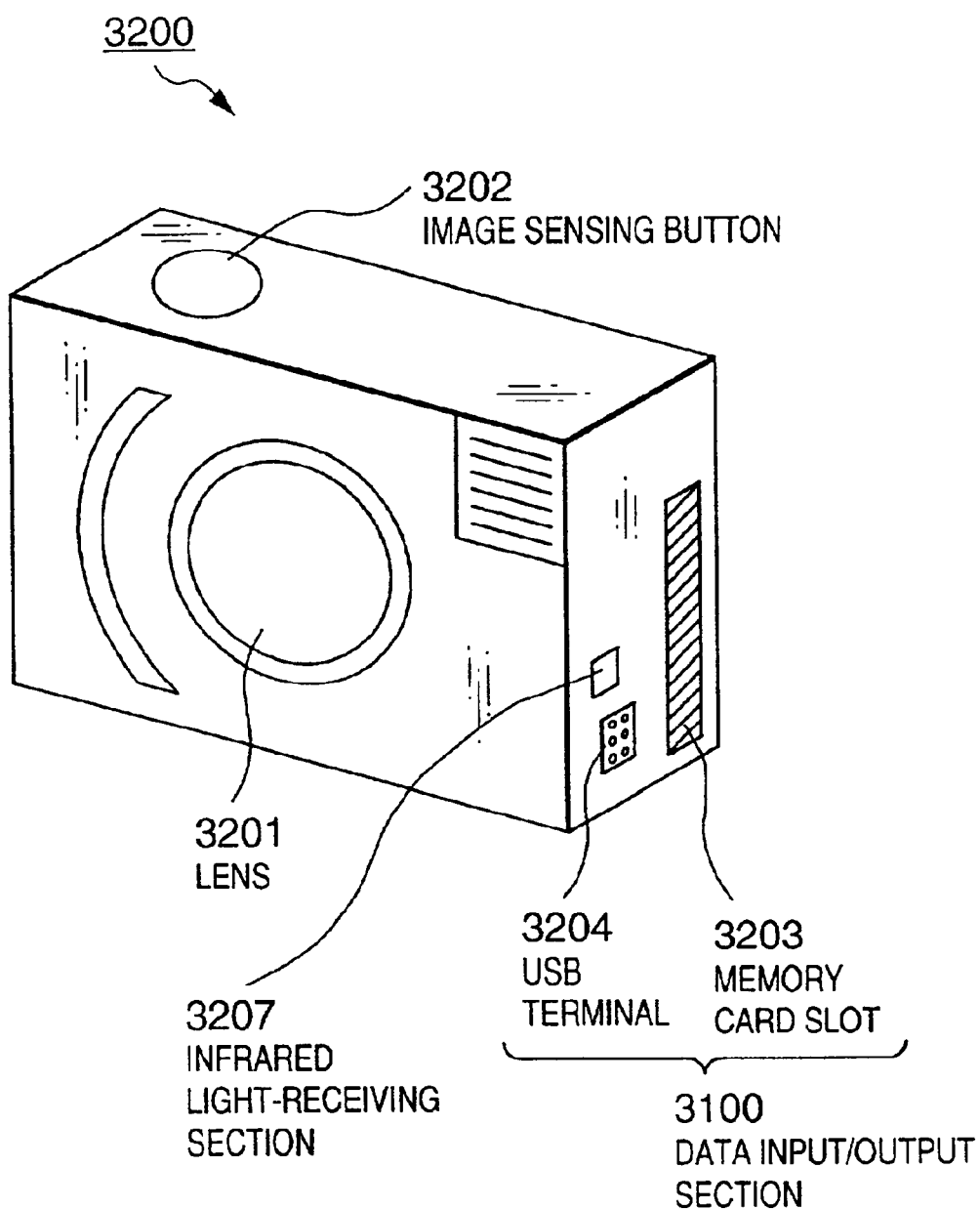
FIG. 28A is a view showing the outer appearance of the recording apparatus according to the third embodiment.
Figure 28B:
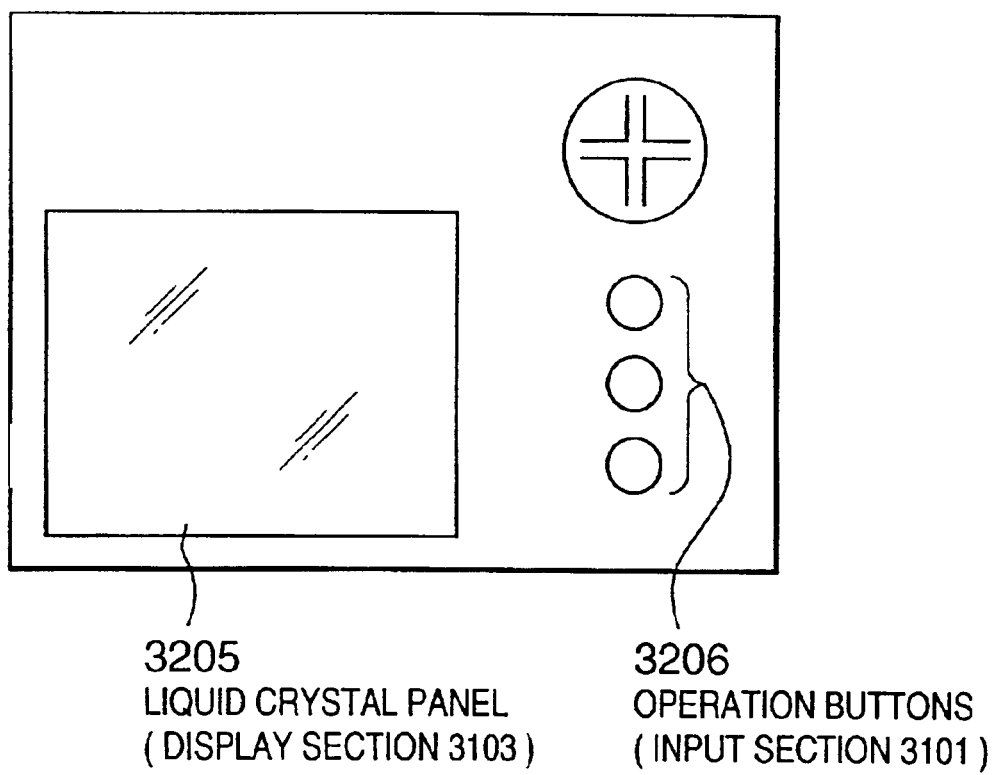
FIG. 28B is the rear view of the rear surface of the recording apparatus according to the third embodiment.

A CCD 3108 converts an optical image obtained by image sensing into an electrical signal, thereby generating image data. To convert voice into an electrical signal to generate voice data, a microphone (not shown) can be used in place of the CCD 3108. Although the system configuration includes various components in addition to the above components, a detailed description thereof will be omitted because they are not main components of the present invention. FIGS. 28A and 28B are views showing the outer appearance of the recording apparatus 3200. The front surface shown in FIG. 28A has an image sensing lens 3201, and the upper surface has an image sensing button as a member of the input section 3101. The side surface shown in FIG. 28A has a memory card slot as a member of the data input section 3100, so data can be loaded into the recording apparatus 3200 through the memory card 403 inserted into the slot. The side surface also has a USB terminal 3204 as an input terminal as another member of the data input section 3100, through which the meta-data generation apparatus 4000 can be connected, thereby enabling exchange of meta-data or image data.

The rear surface shown in FIG. 28B has a liquid crystal panel as the display section 3103, so sensed image data can be displayed, or a GUI for meta-data attachment can be displayed. The rear surface has operation buttons 3206 as members of the input section 3101, which are used for adjustment in image sensing, or to input meta-data or attach meta-data to image data.

In the example shown in FIG. 28A, only the USB terminal 3204 is shown as an input terminal. Any other input terminal such as a parallel terminal or SCSI terminal may be used as far as it can transmit/receive data. The meta-data generation apparatus 4000 and data input/output section 3100 can be connected not directly as described above but using a wireless channel. In this case, a wireless channel interface corresponding to the meta-data generation apparatus 4000 is included in the data input/output section 3100.

Figure 21:
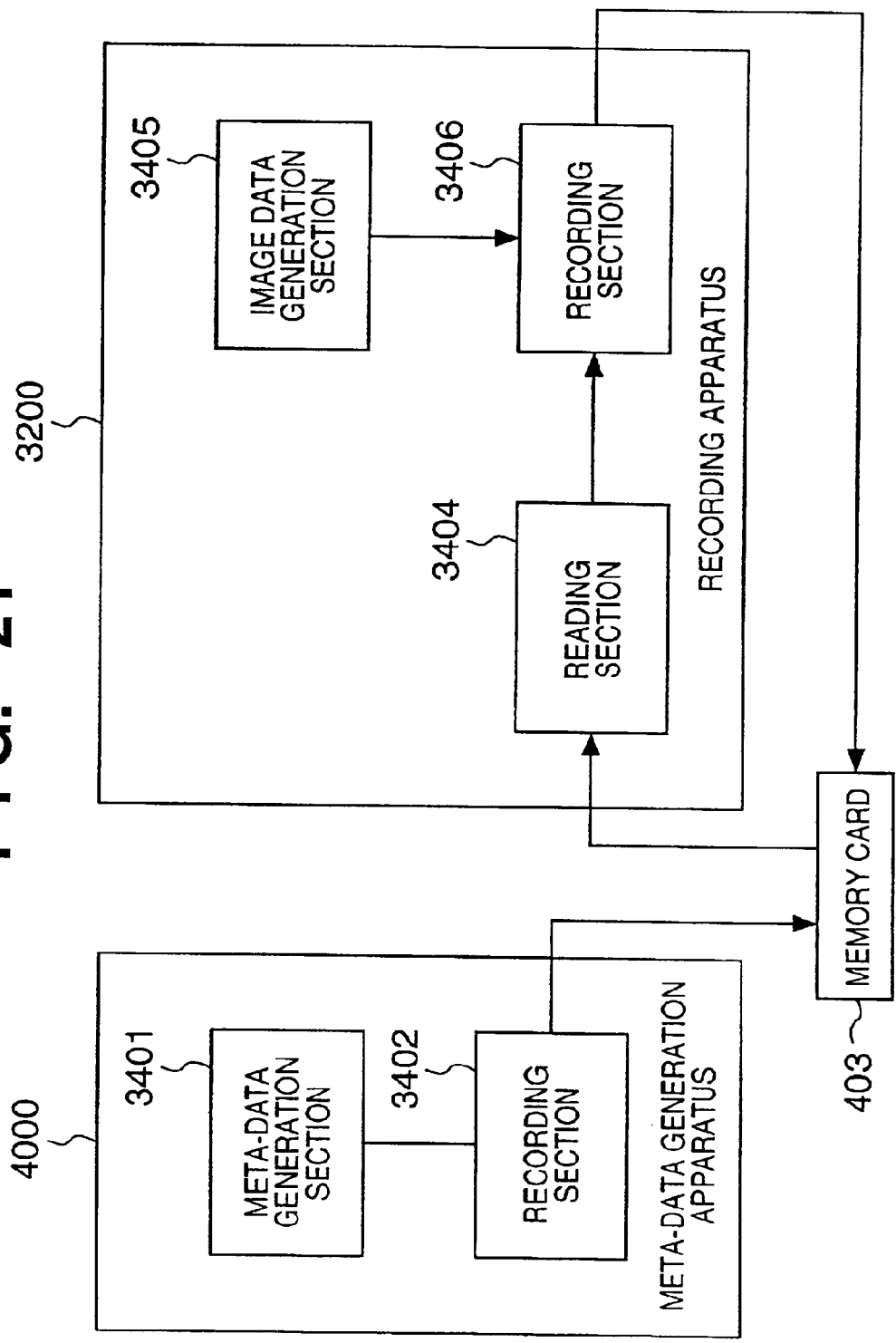
FIG. 21 is a block diagram showing the functional arrangement of the meta-data generation apparatus and first recording apparatus according to the third embodiment.

FIG. 21 is a block diagram showing the functional arrangement using the meta-data generation apparatus 4000 and recording apparatus 3200. The meta-data generation apparatus 4000 comprises a meta-data generation section 3401 and recording section 3402. The meta-data generation section 3401 generates meta-data. The recording section 3402 records the meta-data generated by the meta-data generation section on a memory card. The operation of the meta-data generation section 3401 is performed under the control of the CPU 4104 which controls the control program stored in the ROM 4105 using the work area of the RAM 4106. The operation of storing meta-data on the memory card 403 by the recording section 3402 is performed through the data input/output section 4100.

The recording apparatus 3200 comprises a reading section 3404, image data generation section 3405, and recording section 3406. The reading section 3404 reads out data stored on the memory card 403 through the data input/output section 4100. The image data generation section 3405 generates RGB image data from an image signal obtained by the CCD 3108 or an image compressed by JPEG or the like, as needed. The recording section 3406 links image data to meta-data and outputs the data to the memory card 403 as a first or second recording medium. The operations of the image data generation section 3405 and recording section 3406 are performed under the control of the CPU 3104 which controls the control program stored in the ROM 3105 using the work area of the RAM 3106.

[Generation and Storage of Meta-Data and Binary Data Having Meta-Data]

Generation and storage of meta-data and binary data having meta-data using the meta-data generation apparatus 4000 and recording apparatus 3200 according to the third embodiment (1) will be described below in detail. To generate binary data having meta-data, a method of embedding the entire meta-data in binary data or a method of embedding only meta-data information (e.g., a file name) in binary data is used. These methods will be sequentially described below.

Assume that various events of an athletic meeting are to be sensed using the recording apparatus 3200. Before image sensing or in preparing for the athletic meeting, the user inserts the memory card 403 into the meta-data generation apparatus 4000 and records pieces of information known in advance, including the name of event to be sensed, image sensing location, and data and time of image sensing, as a meta-data template.

[Generation and Storage of Meta-Data by Meta-Data Generation Apparatus]

For example, when pieces of information are known, including the date "1999, July 14", the user name "Taro", the event name "athletic meeting", and the location "athletic park", the meta-data generation apparatus 4000 generates meta-data shown in FIG. 8.

The meta-data input method and meta-data generation method using the meta-data generation apparatus 4000 to obtain the meta-data shown in FIG. 8 are the same as described about the recording apparatus 2200 of the second embodiment. That is, the contents are the same as those described in detail in paragraphs [Input of Meta-Data] to [Write of Meta-Data in Storage Section or on Memory Card] with reference to FIGS. 4 to 7, and a detailed description thereof will be omitted.

The generated XML data shown in FIG. 8 is recorded on the root directory of the memory card 403 with a file name "CardInfo.xml". When this operation is completed, the user removes the memory card 403 from the meta-data generation apparatus 4000 and inserts it into the recording apparatus 3200.

[Generation Of Image Data and Image Data Having Meta-Data by Recording Apparatus]

At the site of image sensing, i.e., in the athletic meeting, the user senses an image using the recording apparatus 3200. Note that the memory card 403 which stores the meta-data generated by the meta-data generation apparatus 4000 is kept inserted into the recording apparatus 3200.

In image sensing, when the user presses an image sensing button 3202 of the input section 3101, an image signal is stored in the CCD 3108, converted into RGB image data, and compressed to JPEG data. When compression is ended, the recording apparatus 3200 reads out the meta-data (CardInfo.xml) from the memory card 403 through the data input/output section 3100, links the meta-data (CardInfo.xml) to the image data to generate image data having meta-data shown in FIG. 22 or 10B, and writes the generated image data having meta-data on the memory card 403 or the like. Thus, image data having meta-data is generated and stored on the memory card 403 or the like.

Processing of linking the meta-data to the image data obtained by image sensing to generate image data having meta-data and storing the generated image data having meta-data on the memory card 403 by the recording apparatus 3200 will be described next in detail with reference to FIG. 26 and FIGS. 10A to 12.

As the method of generating image data having meta-data using the recording apparatus 3200, 1) the first method of embedding all the meta-data in still image data or 2) the second process of attaching only meta-data information to still image data can be used. These two methods are the same as those described about the recording apparatus 200 of the first embodiment. That is, the contents are the same as those described in detail in paragraphs [Processing of Linking Meta-Data to A Plurality of Binary Data] with reference to FIGS. 10A to 12, and a detailed description thereof will be omitted.

[Processing of Storing Generated Image Data Having Meta-Data]

Figure 26:
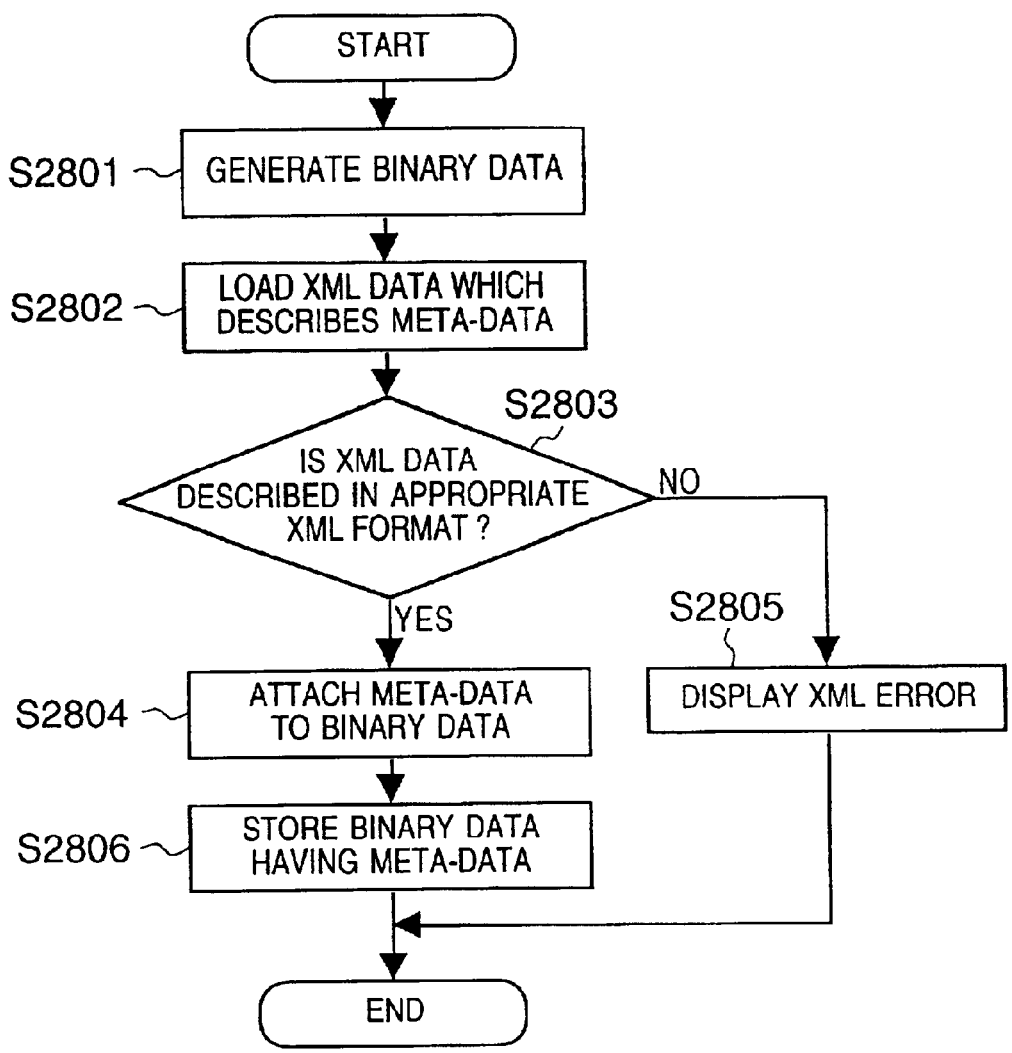
FIG. 26 is a view for explaining the process of generating image data having meta-data in the third embodiment.

Processing of linking meta-data to image data to generate image-data having meta-data, as described with reference to FIGS. 11 and 12, and storing the generated image data having meta-data by the recording apparatus 3200 will be described next with reference to the flow chart shown in FIG. 26. In the example to be described below, the same meta-data is repeatedly attached to each image data generated by image sensing.

Instead of using the method to be described below, for example, a plurality of meta-data can be prepared in advance in correspondence with a plurality of image data to be sensed, and the different meta-data can be selected and repeatedly attached to the image data, respectively.

First, in step S2801, the image data generated through the CCD 3108 is loaded to the RAM 3106.

In step S2802, the above-described meta-data (CardInfo.xml) stored on the memory card 403 is loaded to the RAM 106 through the data input/output section 4100. In the above example, one meta-data stored on the memory card 403 is read out and used. However, a plurality of stored meta-data may be read out and used.

In step S2803, it is checked whether the loaded meta-data is described by an appropriate XML format. If NO in step S2803, the flow advances to step S2805 to display an XML error, and the operation is ended. If YES in step S2803, the flow advances to step S2804. To determine the appropriate format, it is checked whether the description format of an XML file is satisfied (e.g., whether a tag has a correct pair of left and right angle brackets, or the tag format is correct). Determining whether or not the XML data has an appropriate format may include checking whether or not the XML data is valid. Whether or not the XML data is valid is determined by checking, e.g., whether or not the XML data is described in accordance with the schema of DTD (Document Type Definition).

In step 52804, the meta-data is linked to the image data to generate image data having meta-data. More specifically, when an instruction for linking the meta-data to the image data is issued, the meta-data is attached to the image data to generate image data having meta-data. That is, image data having meta-data shown in FIG. 10A or 10B is generated.

In step S2805, the generated image data having meta-data is stored on the memory card 403, and the operation is ended. This image data having meta-data may be stored in the storage section 4102 or both on the memory card 403 and in the storage section 3102.

If the user wants to continue image sensing, the above-described series of operations are repeatedly performed from the beginning, thereby generating new image data having meta-data shown in FIG. 11 or 12. For example, in the case shown in FIG. 11, the same meta-data is repeatedly attached to a plurality of image data to obtain image data having meta-data (file name: AUT_002.jpg, AUT_003.jpg, . . . .)

As described above, only by generating meta-data once in advance, the meta-data can be repeatedly attached to image data obtained by image sensing to generate image data having meta-data. For this reason, operation of generating the image data having meta-data is facilitated. The generated meta-data can also be repeatedly attached to even a plurality of different image data not obtained by image sensing but input from the memory card 403 to generate image data having meta-data.

A plurality of meta-data may be generated in advance and selected as needed such that meta-data of different types are attached to a plurality of image data. In this embodiment, still image data is used as binary data. Instead, voice data or moving image data may be used as binary data.

In step S2804, the image data having meta-data is stored in, e.g., the storage section 3102 or on the memory card 403 inserted into the data input/output section 3100. However, the image data having meta-data may be stored on the memory card 403 as a first storage medium which stores image data before meta-data attachment or another memory card as a second storage medium.

The image data having meta-data may be directly written in the meta-data generation apparatus 4000 through the input terminal of the recording apparatus 3200 or temporarily stored on the memory card 403 or in the storage section 3102 and then written in the meta-data generation apparatus 4000 through the memory card 403 or storage section 3102.

The meta-data generation apparatus 4000 and data input/output section 3100 can be connected not directly as described above but using a wireless channel. In this case, a wireless channel interface corresponding to the meta-data generation apparatus 4000 is included in the data input/output section 3100.

The meta-data may be generated in advance, as described above, or meta-data prepared on a memory card in advance may be used. FIG. 13 is a view showing this example. In this example, for example, a memory card for travel is put on sale, and meta-data for travel which is stored on the memory card in advance is used. A memory card in which meta-data for moving images, meta-data for voice data, and meta-data for still images are prepared in advance in correspondence with binary data may be used.

As described above, when information that is known about image data is prepared as a meta-data template in advance, and meta-data is repeatedly attached to image data in image sensing, the time required to attach meta-data to the image data can be shortened. In this embodiment, the meta-data generation apparatus 4000 and the recording apparatus 3200 must easily exchange data. For this purpose, it is suitable to use a detachable recording medium between the meta-data generation apparatus 4000 and the recording apparatus 3200. Since a general digital camera can mount only one memory card, it is suitable to record both meta-data and image data on a single memory card. When image data is transferred upon embedding meta-data in the image data, the meta-data can always be transferred together with the image data.

[Third Embodiment (2)]

As a recording apparatus according to the third embodiment (2), a recording apparatus 5200 (see FIG. 23) capable of loading meta-data stored in a storage medium or the like, generating moving image data as binary data, and linking the loaded meta-data to a plurality of generated binary data to generate and output binary data each having meta-data will be described. The meta-data is generated by the above-described meta-data generation apparatus 4000, and the generated meta-data is supplied to the recording apparatus 5200 through a portable storage medium or the like.

[Hardware Configuration of Meta-Data Generation Apparatus and Recording Apparatus]

Figure 23:
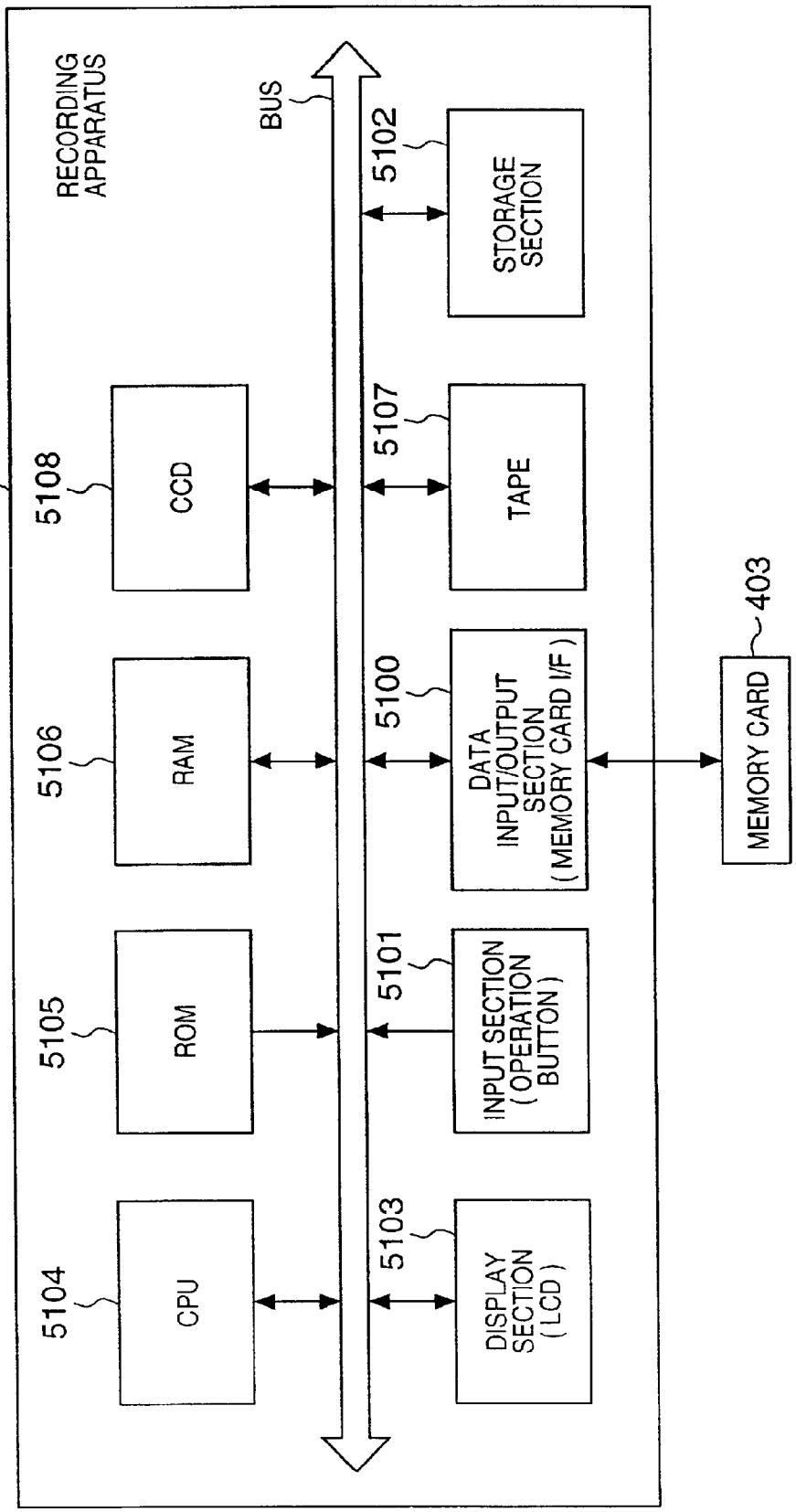
FIG. 23 is a block diagram showing a system configuration of a second recording apparatus according to the third embodiment.

The third embodiment (2) uses the meta-data generation apparatus 4000 shown in FIG. 19 and the recording apparatus 5200 shown in FIG. 23. The meta-data generation apparatus 4000 for generating meta-data is the same as that described in the third embodiment (1), and a detailed description of its hardware configuration will be omitted.

Referring to FIG. 23, a data input/output section 5100 inputs/outputs data (binary data or meta-data). A memory card 5403 and the structure of a memory card slot as one member of the data input/output section 5100 are the same as those described with reference to FIG. 25, and a detailed description thereof will be omitted.

The recording apparatus 5200 is directly connected to the meta-data generation apparatus 4000 via an input terminal such as a USB terminal, SCSI terminal, or parallel terminal as one member of the data input/output section 5100. In the following description, a USB terminal is used as an input terminal. Data (binary data or meta-data) recorded by the meta-data generation apparatus 4000 is directly loaded from the meta-data generation apparatus 4000 to the recording apparatus 5200 through the input terminal, or temporarily stored on the memory card 5403 and then loaded to the recording apparatus 5200 through the memory card 5403. Conversely, data processed by the recording apparatus 5200 is directly written in the meta-data generation apparatus 4000 through the input terminal, or temporarily stored on the memory card 5403 and then written in the meta-data generation apparatus 4000 through the memory card 5403. Data processed by the recording apparatus 5200 is written in a storage section 5102. The meta-data generation apparatus 4000 and data input/output section 5100 can be connected not directly as described above but using a wireless channel. In this case, a wireless channel interface is prepared in the data input/output section 5100.

An input section 5101 inputs data or instructions from the user and is formed from, e.g., operation buttons and the like. The storage section 5102 stores data and is formed from, e.g., a hard disk. A display section 5103 displays a GUI or image and is constructed by, e.g., a CRT or liquid crystal display.

A CPU 5104 controls the entire recording apparatus 5200. A ROM 5105 and RAM 5106 provide to the CPU 5104 a program, data, and work area necessary for processing by the CPU 5104. Necessary control programs are stored in the storage section 5102 or ROM 5105. When the storage section 5102 stores a control program, it is temporarily loaded to the RAM 5106 and then executed. A CCD 5108 converts an optical image obtained by image sensing into an electrical signal, thereby generating image data. A tape drive 5107 stores moving image data.

Figure 24:
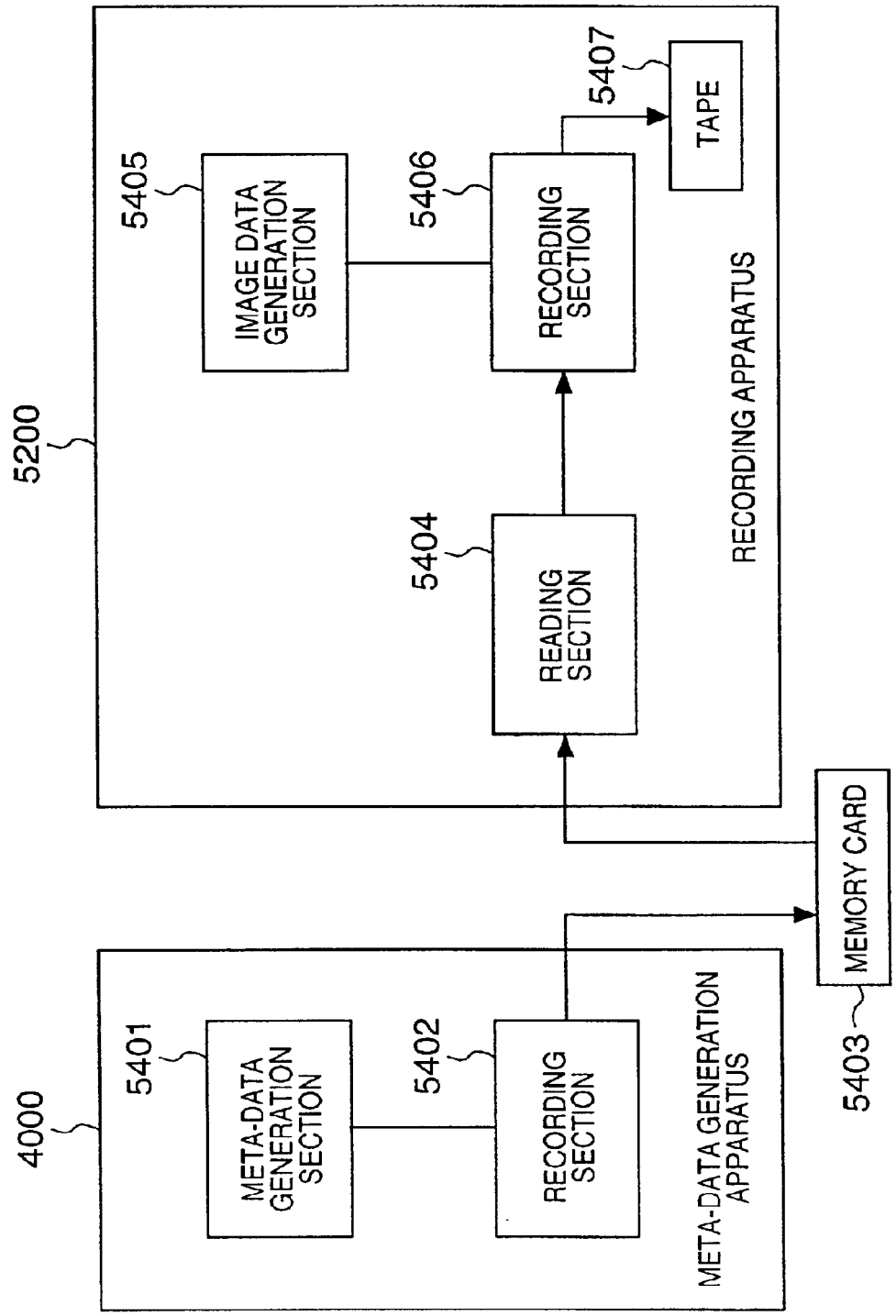
FIG. 24 is a block diagram showing the function of the meta-data generation apparatus and second recording apparatus according to the third embodiment.

FIG. 24 is a block diagram showing the functional arrangement using the meta-data generation apparatus 4000 and recording apparatus 5200. The meta-data generation apparatus 4000 comprises a meta-data generation section 5401 and recording section 5402. The meta-data generation section 5401 generates meta-data such as a title and personal identification information. The recording section 5402 records the meta-data generated by the meta-data generation section on a memory card. The operation of the meta-data generation section is performed under the control of the CPU 5104 which controls the control program stored in the ROM 5105 using the work area of the RAM 5106. The operation of storing meta-data on the memory card 5403 by the recording section 5402 is performed through the data input/output section 5100.

The recording apparatus 5200 comprises a reading section 5404, image data generation section 5405, and recording section 5406. The reading section 5404 reads out data stored on the memory card through the data input/output section 4100. The image data generation section 5405 generates RGB image data from an image signal obtained by the CCD 3108 or an image compressed by Motion-JPEG or the like, as needed. The recording section 5406 links image data to meta-data and outputs the data to the tape. The operations of the image data generation section 5405 and recording section 5406 are performed under the control of the CPU 4104 which controls the control program stored in the ROM 4105 using the work area of the RAM 4106.

[Generation and Storage of Meta-Data and Binary Data Having Meta-Data]

Generation and storage of meta-data and binary data having meta-data using the meta-data generation apparatus 4000 and recording apparatus 5200 according to the third embodiment (2) will be described below in detail. To generate binary data having meta-data, a method of embedding the whole meta-data in binary data or a method of embedding only meta-data information (e.g., a file name) in binary data is used. These methods will be sequentially described below.

Assume that various events of an athletic meeting are to be sensed using the recording apparatus 5200. Before image sensing or in preparing for the athletic meeting, the user inserts the memory card 5403 into the meta-data generation apparatus 4000 and records pieces of information known in advance, including the name of event to be sensed, image sensing location, and data and time of image sensing, as a meta-data template.

[Generation and Storage of Meta-Data by Meta-Data Generation Apparatus]

For example, when pieces of information are known, including the date "1999, July 14", the user name "Taro", the event name "athletic meeting", and the location "athletic park", the meta-data generation apparatus 4000 generates meta-data shown in FIG. 8.

The meta-data input method and meta-data generation method using the meta-data generation apparatus 4000 to obtain the meta-data shown in FIG. 8 are the same as described about the recording apparatus 2200 of the second embodiment. That is, the contents are the same as those described in detail in paragraphs [Input of Meta-Data] to [Write of Meta-Data in Storage Section or on Memory Card] with reference to FIGS. 4 to 7, and a detailed description thereof will be omitted.

The generated XML data shown in FIG. 8 is recorded on the root directory of the memory card 5403 with a file name "CardInfo.xml". When this operation is ended, the user removes the memory card 5403 from the meta-data generation apparatus 4000 and inserts it into the recording apparatus 5200.

[Generation of Image Data and Image Data Having Meta-Data by Recording Apparatus]

At the site of image sensing, i.e., at the athletic meeting, the user senses an image using the recording apparatus 5200. Note that the memory card 5403 which stores the meta-data generated by the meta-data generation apparatus 4000 is kept inserted into the recording apparatus 5200.

In image sensing, when the user presses the image sensing button of the input section 5101, an image signal is stored in the CCD 5108, converted into RGB image data, compressed to JPEG data, and recorded no a tape device. At this time, a pointer to "CardInfo.xml" is recorded in the DV format.

Figure 22:
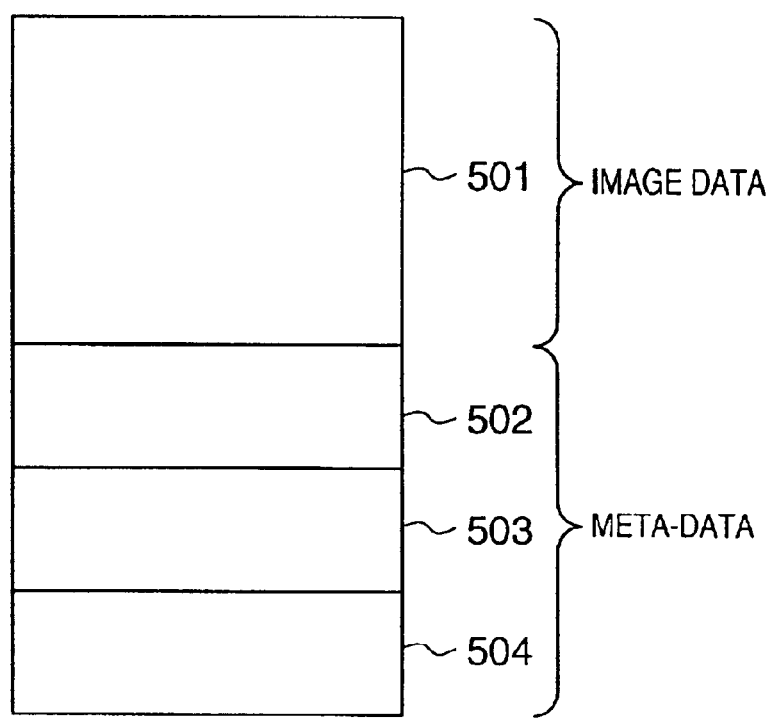
FIG. 22 shows the structure of image data having meta-data, in which meta-data is embedded following image data.

When compression is ended, the recording apparatus 5200 reads out the meta-data (CardInfo.xml) from the memory card 5403 through the data input/output section 5100, links the meta-data (CardInfo.xml) to the image data to generate image data having meta-data shown in FIG. 22 or 10B, and writes the generated image data having meta-data on the memory card 5403 or the like. Thus, image data having meta-data is generated and stored on the memory card 5403 or the like. As described above, even for moving image data, when information known in advance is prepared as a meta-data template and repeatedly attached to the moving image data in image sensing, moving image data having meta-data can be easily generated.

Processing of linking the meta-data to the image data obtained by image sensing to generate image data having meta-data and storing the generated image data having meta-data on the memory card 5403 by the recording apparatus 5200 will be described next in detail with reference to FIG. 26 and FIGS. 10A to 12. As the method of generating image data having meta-data using the recording apparatus 5200, 1) the first method of embedding the entire meta-data in moving image data or 2) the second process of attaching only meta-data information to moving image data can be used.

These two methods are the same as those described about the recording apparatus 3200 of the third embodiment (1). That is, the contents are the same as those described in detail in paragraphs [Processing of Linking Meta-Data to a Plurality of Binary Data] to [Processing of Storing Generated Image Data Having Meta-Data] with reference to FIGS. 10A to 12 and FIG. 26, and a detailed description thereof will be omitted.

As described above, according to the third embodiment (1) and third embodiment (2), the meta-data generation apparatus 4000 dedicated to generate meta-data is separated from the recording apparatus 3200 or 5200 for sensing binary data and generating and storing image data having meta-data, thereby further facilitating meta-data generation.

[Other Embodiment]

The present invention may be applied to a system constituted by a plurality of devices (e.g., a host computer, an interface device, a reader, a printer, and the like) or an apparatus comprising a single device (e.g., a copying machine, a facsimile apparatus, or the like). The object of the present invention is realized even by supplying a storage medium (or recording medium) storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the flow charts described in the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A recording apparatus for attaching, to a set of binary data, meta-data as information identifying the set of binary data, the apparatus comprising:

meta-data accessing means for accessing meta-data to be used to identify a group of plural sets of binary data;

binary data accessing means for accessing plural sets of binary data; and meta-data attaching means for obtaining meta-data identifying a group of plural sets of binary data by using said meta-data accessing means, and then repeatedly attaching the same meta-data accessed by said meta-data accessing means to the group of plural sets of binary data accessed by said binary data accessing means to create the group of plural sets of binary data, every set having the same meta-data, when the recording apparatus accesses plural sets of binary data by said binary data accessing means.

2. The recording apparatus according to claim 1, characterized by further comprising storage means for storing the binary data having meta-data output by said meta-data attaching means.

3. The recording apparatus according to claim 1, characterized by further comprising binary data having meta-data write means for writing the binary data having meta-data output by said meta-data attaching means in a detachable storage medium or external device.

4. The recording apparatus according to claim 2, characterized by further comprising binary data having meta-data write means for writing the binary data having meta-data stored in said storage means in a detachable storage medium or external device.

5. The recording apparatus according to claim 1, characterized in that said apparatus further comprises meta-data loading means for loading meta-data stored in advance in a detachable storage medium or external device, and said meta-data attaching means attaches the meta-data loaded by said meta-data loading means to the binary data to generate the binary data having meta-data.

6. The recording apparatus according to claim 1, characterized in that said apparatus further comprises binary data loading means for loading binary data stored in a first detachable storage medium or external device, and said meta-data attaching means attaches the meta-data to the binary data loaded by said binary data loading means, to generate the binary data having meta-data.

7. The recording apparatus according to claim 6, characterized by further comprising binary-data having meta-data write means for writing the binary data having meta-data output by said meta-data attaching means in the first storage medium as a loading source of the binary data.

8. The recording apparatus according to claim 6, characterized by further comprising binary-data having meta-data write means for writing the binary data having meta-data stored in said storage means in the first storage medium as a loading source of the binary data.

9. The recording apparatus according to claim 1, characterized in that said meta-data attaching means embeds the meta-data to a predetermined position of the binary data.

10. The recording apparatus according to claim 1, characterized in that said meta-data attaching means attaches only information representing a file name of the meta-data or a location of the meta-data to a predetermined position of the binary data.

11. The recording apparatus according to claim 1, wherein said meta-data attaching means is driven after an insertion of a memory card storing binary data, a connection of interface cable for accessing binary data, or a start of communication for accessing binary data.

12. A recording method of attaching, to a set of binary data, meta-data as information identifying the set of binary data, the method comprising:

a meta-data accessing step of accessing meta-data to be used to identify a group of plural sets of binary data;

a binary data accessing step of accessing plural sets of binary data; and a meta-data attaching step of obtaining meta-data identifying a group of plural sets of binary data by causing execution of said meta-data accessing step, and then repeatedly attaching the same meta-data accessed in said meta-data accessing step to the group of plural sets of binary data accessed in the binary data accessing step to create the group of plural sets of binary data, every set having the same meta-data, when plural sets of binary data are accessed in said binary data accessing step.

13. The recording method according to claim 12, characterized by further comprising the storage step of storing the binary data having meta-data output by the meta-data attaching step.

14. The recording method according to claim 13, characterized by further comprising the binary data having a meta-data write step of writing the binary data having meta-data output by the meta-data attaching step in a detachable storage medium or external device.

15. The recording method according to claim 13, characterized by further comprising the binary data having meta-data write step of writing the binary data having meta-data stored in the storage step in a detachable storage medium or external device.

16. The recording method according to claim 12, characterized in that said recording method further comprises the meta-data loading step of loading meta-data stored in advance in a detachable storage medium or external device, and the meta-data attaching step comprises attaching the meta-data loaded in the meta-data loading step to the binary data to generate the binary data having meta-data.

17. The recording method according to claim 12, further characterized in that the recording method further comprises binary data loading step of loading the binary data stored in a first detachable storage medium or external device, and the meta-data attaching step comprises attaching the meta-data to the binary data loaded in the binary data loading step to generate the binary data having meta-data.

18. The recording method according to claim 17, characterized by further comprising the binary-data having meta-data write step of writing the binary data having meta-data output by the meta-data attaching step in the first detachable storage medium as a loading source of the binary data.

19. The recording method according to claim 17, characterized by further comprising the binary-data having meta-data write step of writing the binary data having meta-data stored in the storage step in the first detachable storage medium as a loading source of the binary data.

20. The recording method according to claim 12, characterized in that the meta-data attaching step comprises embedding the meta-data to a predetermined position of the binary data.

21. The recording method according to claim 12, characterized in that the meta-data attaching step comprises attaching only information representing a file name of the meta-data or a location of the meta-data to a predetermined position of the binary data.

22. The recording method according to claim 12, wherein in said meta-data attaching step said meta-data attaching means is driven after an insertion of a memory card storing binary data, a connection of interface cable for accessing binary data, or a start of communication for accessing binary data.

23. A storage medium which stores a processing program for attaching, to a set of binary data, meta-data as information identifying the set of binary data, the processing program comprising:

a meta-data accessing step of accessing meta-data to be used to identify a group of plural sets of binary data;

a binary data accessing step of accessing plural sets of binary data to which the generated meta-data is to be attached; and a meta-data attaching step of obtaining meta-data identifying a group of plural sets of binary data by causing execution of said meta-data accessing step, and then repeatedly attaching the same meta-data accessed in said meta-data accessing step to the group of plural sets of binary data accessed in the binary data accessing step to create the group of plural sets of binary data, every set having the same meta-data, when plural sets of binary data are accessed in said binary data accessing step.

24. A recording apparatus for attaching, to a set of binary data, meta-data as information identifying the set of binary data, the apparatus comprising:

meta-data accessing means for accessing meta-data to be used to identify a group of plural sets of binary data;

binary data loading means for loading plural sets of binary data to which the generated meta-data is to be attached from a first detachable storage medium or external device; and meta-data attaching means for obtaining meta-data identifying a group of plural sets of binary data by using said meta-data accessing means, and then repeatedly attaching the same meta-data accessed by said meta-data accessing means to the group of plural sets of binary data loaded by said binary data loading means to create the group of plural sets of binary data, every set having the same meta-data, when the recording apparatus loads plural sets of binary data by said binary data loading means.

25. The recording apparatus according to claim 24, characterized by further comprising storage means for storing the binary data having meta-data outputted by said meta-data attaching means.

26. The recording apparatus according to claim 24, characterized by further comprising binary data having meta-data write means for writing the binary data having meta-data output from said meta-data attaching means in the first detachable storage medium or external device as a loading source of the binary data.

27. The recording apparatus according to claim 24, characterized by further comprising binary data having meta-data write means for writing the binary data having meta-data output from said meta-data attaching means in a second detachable storage medium or external device different from a loading source of the binary data.

28. The recording apparatus according to claim 25, characterized by further comprising binary data having meta-data write means for writing the binary data having meta-data stored in said storage means in the first storage medium as a loading source of the binary data.

29. The recording apparatus according to claim 25, characterized by further comprising binary data having meta-data write means for writing the binary data having meta-data stored in said storage means in a second detachable storage medium or external device different from a loading source of the binary data.

30. The recording apparatus according to claim 24, further characterized in that said recording apparatus further comprises loading means for loading meta-data stored, in advance, in a detachable storage medium or external device, and said meta-data attaching means attaches the meta-data loaded by said meta-data loading means to the binary data.

31. The recording apparatus according to claim 24, characterized in that said meta-data attaching means embeds the meta-data to a predetermined position of the binary data.

32. The recording apparatus according to claim 24, characterized in that said meta-data attaching means attaches only information representing a file name of the meta-data or a location of the meta-data to a predetermined position of the binary data.

33. The storage medium processing program according to claim 23, wherein in said meta-data attaching step, said meta-data attaching means is driven after an insertion of a memory card storing binary data, a connection of interface cable for accessing binary data, or a start of communication for accessing binary data.

34. The recording apparatus according to claim 24, wherein said meta-data attaching means is driven after an insertion of a memory card storing binary data, a connection of interface cable for accessing binary data, or a start of communication for accessing binary data.

35. A recording method of attaching, to a set of binary data, meta-data as information identifying the set of binary data, the method comprising:

a meta-data accessing step of accessing meta-data identifying a group of plural sets of binary data;

a binary data loading step of loading plural sets of binary data to which the generated meta-data is to be attached from a first detachable storage medium or external device; and a meta-data attaching step of obtaining meta-data identifying a group of plural sets of binary data by causing execution of said meta-data accessing step, and then repeatedly attaching the same meta-data accessed in said meta-data accessing step to the group of plural sets of binary data loaded in the binary data loading step to create the group of plural sets of binary data, every set having the same meta-data, when plural sets of binary data are loaded in said binary data loading step.

36. The recording method according to claim 35, characterized by further comprising a storage step of storing the binary data having meta-data output in the meta-data attaching step.

37. The recording method according to claim 35, characterized by further comprising a binary-data having meta-data write step of writing a binary data having meta-data output by the meta-data attaching step in the first storage medium as a loading source of the binary data.

38. The recording method according to claim 35, characterized by further comprising the binary-data having meta-data write step of writing the binary data having meta-data output by the meta-data attaching step in a second detachable storage medium or external device different from a loading source of the binary data.

39. The recording method according to claim 36, characterized by further comprising the binary data having meta-data write step of writing the binary data having meta-data stored in the storage step in the first detachable storage medium as a loading source of the binary data.

40. The recording method according to claim 36, characterized by further comprising binary data having meta-data write step of writing the binary data having meta-data stored in the storage step in a second detachable storage medium or external device different from a loading source of the binary data.

41. The recording method according to claim 35, characterized in that the recording method further comprises a loading step of loading meta-data stored, in advance, in a detachable storage medium or external device, and the meta-data attaching step comprises attaching the meta-data loaded in the meta-data loading step to the binary data.

42. The recording method according to claim 35, characterized in that the meta-data attaching step comprises embedding the meta-data to a predetermined position of the binary data.

43. The recording method according to claim 35, characterized in that the meta-data attaching step comprises attaching only information representing a file name of the meta-data or a location of the meta-data to a predetermined position of the binary data.

44. The recording method according to claim 35, wherein in said meta-data attaching step, said meta-data attaching means is driven after an insertion of a memory card storing binary data, a connection of interface cable for accessing binary data, or a start of communication for accessing binary data.

45. A storage medium which stores a processing program for attaching, to a set of binary data, meta-data as information identifying the set of binary data, the processing program comprising:
  a meta-data accessing step of accessing meta-data to be used to identify a group of plural sets of binary data;
  a binary data loading means for loading plural sets of binary data to which the generated meta-data is to be attached from a first detachable storage medium or external device; and,
  a meta-data attaching step of obtaining meta-data identifying a group of plural sets of binary data by causing execution of said meta-data accessing step, and then repeatedly attaching the same meta-data accessed in said meta-data accessing step to the group of plural-sets of binary data loaded in the binary data loading step to create the group of plural-sets of binary data, each set having the same meta-data, when plural-sets of binary data are loaded in said binary data loading step.

46. The storage medium processing program according to claim 45, wherein in said meta-data attaching step, said meta-data attaching means is driven after an insertion of a memory card storing binary data, a connection of interface cable for accessing binary data, or a start of communication for accessing binary data.

47. A recording apparatus for attaching, to a set of binary data, meta-data as information identifying the set of binary data, the apparatus comprising:
  meta-data loading means for loading meta-data to be used to identify a group of plural-sets of binary data from a first detachable storage medium or external device;
  binary data accessing means for accessing plural-sets of binary data; and
  meta-data attaching means for obtaining meta-data identifying a group of plural-sets of binary data by using said meta-data loading means, and then repeatedly attaching the same meta-data loaded by said meta-data loading means to the group of plural-sets of binary data accessed by said binary data accessing means to create the group of plural-sets of binary data, every set having the same meta-data, when the recording apparatus accesses plural-sets of binary data by said binary data accessing means.

48. The recording apparatus according to claim 47, characterized by further comprising storage means for storing the binary data having meta-data output by said meta-data attaching means.

49. The recording apparatus according to claim 47, characterized by further comprising binary data having meta-data write means for writing the binary data having meta-data output from said meta-data attaching means in the first storage medium or external device as a loading source of the meta-data.

50. The recording apparatus according to claim 47, characterized by further comprising binary data having meta-data write means for writing the binary data having meta-data output by said meta-data attaching means in a second detachable storage medium or external device different from a loading source of the binary data.

51. The recording apparatus according to claim 47, characterized by further comprising binary-data having meta-data write means for writing the binary data having meta-data stored in said storage means in the first detachable storage medium as a loading source of the meta-data.

52. The recording apparatus according to claim 47, characterized by further comprising binary data having meta-data write means for writing the binary data having meta-data stored in said storage means in a second detachable storage medium or external device different from a loading source of the meta-data.

53. The recording apparatus according to claim 47, characterized in that said apparatus further comprises binary data loading means for loading binary data stored in advance in a detachable storage medium or external device, and
  said meta-data attaching means attaches the meta-data loaded by said meta-data loading means to the binary data to generate the binary data having meta-data.

54. The recording apparatus according to claim 47, characterized in that said meta-data attaching means embeds the meta-data to a predetermined position of the binary data.

55. The recording apparatus according to claim 47, characterized in that said meta-data attaching means attaches only information representing a file name of the meta-data or a location of the meta-data to a predetermined position of the plural sets of binary data.

56. The recording apparatus according to claim 47, wherein said meta-data attaching means is driven after an insertion of a memory card storing binary data, a connection of interface cable for accessing binary data, or a start of communication for accessing binary data.

57. A recording method of attaching, to a set of binary data, meta-data as information identifying the set of binary data, the method comprising:
  a meta-data loading step of loading meta-data to be used to identify a group of plural sets of binary data from a first detachable storage medium or external device;
  a binary data accessing step of accessing plural sets of binary data; and
  a meta-data attaching step of obtaining meta-data identifying a group of plural sets of binary data by causing execution of said meta-data loading step, and then repeatedly attaching the same meta-data loaded in the meta-data loading step to the group of plural sets of binary data accessed in the binary data accessing step to create the group of plural sets of binary data, every set having the same meta-data, when plural sets of binary data are accesed in said binary data accessing step.

58. The recording method according to claim 57, characterized by further comprising the storage step of storing the binary data having meta-data output by the meta-data attaching step.

59. The recording method according to claim 57, characterized by further comprising the binary data having meta-data write step of writing the binary data having meta-data output by the meta-data attaching step in the first storage medium or external device as a loading source of the binary data.

60. The recording method according to claim 57, characterized by further comprising the binary data having meta-data write step of writing the binary data having meta-data output by the meta-data attaching step in a second detachable storage medium or external device different from a loading source of the binary data.

61. The recording method according to claim 57, characterized by further comprising the binary data having meta-data write step of writing the binary data having meta-data stored in the storage step in the first storage medium as a loading source of the binary data.

62. The recording method according to claim 57, characterized by further comprising the binary data having meta-data write step of writing the binary data having meta-data stored in the storage step in a second detachable storage medium or external device different from a loading source of the binary data.

63. The recording method according to claim 57, characterized in that said method further comprises the binary data loading step of loading binary data stored, in advance, in a detachable storage medium or external device, and the meta-data attaching step comprises attaching the meta-data loaded in the meta-data loading step to the binary data to generate the binary data having meta-data.

64. The recording method according to claim 57, characterized in that the meta-data attaching step comprises embedding the meta-data to a predetermined position of the binary data.

65. The recording method according to claim 57, characterized in that the meta-data attaching step comprises attaching only information representing a file name of the meta-data or a location of the meta-data to a predetermined position of the binary data.

66. The recording method according to claim 57, wherein in said meta-data attaching step, said meta-data attaching means is driven after an insertion of a memory card storing binary data, a connection of interface cable for accessing binary data, or a start of communication for accessing binary data.

67. A storage medium which stores a processing program for attaching, to a set of binary data, meta-data as information identifying the set of binary data, the processing program comprising:

a meta-data loading step of loading meta-data to be used to identify a group of plural sets of binary data from a first detachable storage medium or external device;

a binary data accessing step of accessing plural sets of binary data; and a meta-data attaching step of obtaining meta-data identifying a group of plural sets of binary data by causing execution of said meta-data loading step, and then repeatedly attaching the same meta-data loaded in the meta-data loading step to the group of plural sets of binary data accessed in the binary data accessing step to create the group of plural sets of binary data, every set having the same meta-data, when the recording apparatus accesses plural sets of binary data are accessed in said binary data accessing step.

68. The storage medium processing program according to claim 67, wherein in said meta-data attaching step, said meta-data attaching means is driven after an insertion of a memory card storing binary data, a connection of interface cable for accessing binary data, or a start of communication for accessing binary data.

* * * * *

UNITED STATES PATENT AND TRADEMARK OFFICE
CERTIFICATE OF CORRECTION

| | | |
|---|---|---|
| PATENT NO. | : 7,111,022 B1 | |
| APPLICATION NO. | : 09/651293 | |
| DATED | : September 19, 2006 | |
| INVENTOR(S) | : Kentaro Matsumoto et al. | |

It is certified that error appears in the above-identified patent and that said Letters Patent is hereby corrected as shown below:

ON THE TITLE PAGE [56] REFERENCES CITED:

Other Publications, after Kuchinsky,
"A. et al., (second occurrence) should be deleted and
"PA.," should read --PA,-- and
"1999." should read --1999,--.

ON THE TITLE PAGE [57] ABSTRACT:

Line 6, "generate" should read --generates--.

COLUMN 4:

Line 23, "PCMCIA" should read --PCMCA--; and
Line 47, "is" should be deleted.

COLUMN 8:

Line 4, "inputed" should read --inputted--; and
Line 5, "inputed" should read --inputted--.

COLUMN 9:

Line 19, "is" should be deleted.

COLUMN 10:

Line 30, "by" should be deleted;
Line 31, "Fig. 12," should read --Fig. 12.--; and
Line 34, "003.jpg, . . . .)" should read --003.jpg, . . . .).--.

COLUMN 11:

Line 25, "AUT_003.jpg, . . . .)" should read --AUT_003.jpg, . . . .).--.

UNITED STATES PATENT AND TRADEMARK OFFICE
CERTIFICATE OF CORRECTION

PATENT NO. : 7,111,022 B1
APPLICATION NO. : 09/651293
DATED : September 19, 2006
INVENTOR(S) : Kentaro Matsumoto et al.

It is certified that error appears in the above-identified patent and that said Letters Patent is hereby corrected as shown below:

COLUMN 12:

Line 15, "PCMCIA" should read --PCMCA--; and
   Line 19, "strage" should read --storage--.

COLUMN 17:

Line 36, "invension" should read --invention--;
   Line 47, "AUT_003.jpg, ....)" should read --AUT_003.jpg, ....).--; and
   Line 67, "AUT_003.jpg, ....)" should read --AUT_003.jpg, ....).--.

COLUMN 18:

Line 6, "by" should be deleted; and
   Line 15, "FIG. 12," should read --FIG. 12.--.

COLUMN 19:

Line 13, "AUT_003.jpg, ....)" should read --AUT_003.jpg, ....).--; and
   Line 49, "a-wireless" should read --a wireless--.

COLUMN 20:

Line 67, "section 4163" should read --section 4103--.

COLUMN 21:

Line 6, "maybe" should read --may be--.

COLUMN 24:

Line 27, "step 52804," should read --step S2804,--; and
   Line 44, "AUT_002.jpg, AUT_003.jpg, ....)" should read
       --AUT_002.jpg, AUT_003.jpg, ....).--.

UNITED STATES PATENT AND TRADEMARK OFFICE
CERTIFICATE OF CORRECTION

PATENT NO. : 7,111,022 B1
APPLICATION NO. : 09/651293
DATED : September 19, 2006
INVENTOR(S) : Kentaro Matsumoto et al.

It is certified that error appears in the above-identified patent and that said Letters Patent is hereby corrected as shown below:

COLUMN 27:

Line 40, "no" should read --to--.

COLUMN 29:

Line 32, "binary-data" should read --binary data--; and
Line 37, "binary-data" should read --binary data--.

COLUMN 30:

Line 29, "comprises binary" should read --comprises the binary--.

COLUMN 31:

Line 63, "for-loading" should read --for loading--.

COLUMN 32:

Line 42, "a" should read --the--.

COLUMN 33:

Line 32, "plural-sets" should read --plural sets--;
Line 34, "plural-sets" should read --plural sets--;
Line 35, "plural-sets" should read --plural sets--;
Line 47, "plural-sets" should read --plural sets--;
Line 49, "plural-sets" should read --plural sets--;
Line 53, "plural-sets" should read --plural sets--;
Line 56, "plural-sets" should read --plural sets--;
Line 58, "plural-sets" should read --plural sets--; and
Line 60, "plural-sets" should read --plural sets--.

UNITED STATES PATENT AND TRADEMARK OFFICE
CERTIFICATE OF CORRECTION

PATENT NO. : 7,111,022 B1
APPLICATION NO. : 09/651293
DATED : September 19, 2006
INVENTOR(S) : Kentaro Matsumoto et al.

It is certified that error appears in the above-identified patent and that said Letters Patent is hereby corrected as shown below:

<u>COLUMN 34</u>:

Line 11, "binary-data" should read --binary data--; and
Line 56, "accesed" should read --accessed--.

Signed and Sealed this

Twenty-fifth Day of November, 2008

JON W. DUDAS
*Director of the United States Patent and Trademark Office*